United States Patent
Zhang et al.

(10) Patent No.: US 12,095,724 B2
(45) Date of Patent: Sep. 17, 2024

(54) CAPABILITY DISCOVERY IN AN INFORMATION CENTRIC NETWORK

(71) Applicant: Intel Corporation, Santa Clara, CA (US)

(72) Inventors: Yi Zhang, Portland, OR (US); Srikathyayani Srikanteswara, Portland, OR (US); Hao Feng, Hillsboro, OR (US); Nageen Himayat, Fremont, CA (US); Gabriel Arrobo Vidal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/280,606

(22) PCT Filed: Dec. 23, 2021

(86) PCT No.: PCT/US2021/065092
§ 371 (c)(1),
(2) Date: Sep. 6, 2023

(87) PCT Pub. No.: WO2022/220885
PCT Pub. Date: Oct. 20, 2022

(65) Prior Publication Data
US 2024/0146685 A1 May 2, 2024

Related U.S. Application Data

(60) Provisional application No. 63/173,926, filed on Apr. 12, 2021, provisional application No. 63/173,940, filed on Apr. 12, 2021.

(51) Int. Cl.
*G06F 15/16* (2006.01)
*H04L 61/45* (2022.01)
*H04L 61/58* (2022.01)

(52) U.S. Cl.
CPC ............ *H04L 61/457* (2022.05); *H04L 61/58* (2022.05)

(58) Field of Classification Search
CPC .............................. H04L 61/58; H04L 61/457
(Continued)

(56) References Cited

U.S. PATENT DOCUMENTS 7,590,733 B2 * 9/2009 Lum .................... H04L 63/0236
713/168
7,890,658 B2 * 2/2011 Lum .................... H04L 61/5014
713/168

(Continued)

FOREIGN PATENT DOCUMENTS

WO WO-2022220885 A1 10/2022

OTHER PUBLICATIONS

"International Application Serial No. PCT/US2021/065092, International Search Report mailed Apr. 25, 2022", 3 pgs.

(Continued)

*Primary Examiner* — Moustafa M Meky
(74) *Attorney, Agent, or Firm* — Schwegman Lundberg & Woessner, P.A.

(57) ABSTRACT

System and techniques for capability discovery in an information centric network (ICN) are described herein. An ICN node receives a discovery packet that includes a discovery type corresponding to an indication of a node capability requested by a source node of the discovery packet. First capability data, from an intermediate node, is extracted from the discovery packet. The first capability data is stored locally by ICN node. Second capability data from the ICN node is added to the discovery packet to create an expanded discovery packet. The expanded discovery packet is then communicated by the ICN node.

20 Claims, 14 Drawing Sheets

(58) Field of Classification Search
USPC .......................................................... 709/3
See application file for complete search history.

(56) References Cited

U.S. PATENT DOCUMENTS

| | | | | |
|---|---|---|---|---|
| 8,050,267 | B2* | 11/2011 | Townsley | ............ H04L 61/2535 |
| | | | | 370/392 |
| 9,319,335 | B1* | 4/2016 | Tripathi | .............. H04L 12/6418 |
| 9,338,733 | B1* | 5/2016 | Poppenga | ............. H04W 48/16 |
| 9,634,928 | B2* | 4/2017 | Choudhury | ............. H04L 45/42 |
| 9,660,937 | B2* | 5/2017 | Agarwal | ................ H04L 49/15 |
| 9,736,110 | B2* | 8/2017 | Li | ........................ H04L 61/5014 |
| 9,749,251 | B2* | 8/2017 | Tripathi | ................... H04L 45/66 |
| 10,051,688 | B1* | 8/2018 | Huang | .................... H04L 61/58 |
| 10,432,578 | B2* | 10/2019 | Hooda | ................ H04L 61/5014 |
| 10,630,542 | B2* | 4/2020 | Yeh | ......................... H04L 45/26 |
| 11,128,596 | B2* | 9/2021 | Bhaskaran | ............ H04W 76/12 |
| 11,212,179 | B2* | 12/2021 | Jailani | ................. H04L 41/0886 |
| 2007/0211735 | A1* | 9/2007 | Williamson | ........ H04L 61/2539 |
| | | | | 370/401 |
| 2014/0149532 | A1 | 5/2014 | Kim et al. | |
| 2014/0195641 | A1 | 7/2014 | Wang et al. | |
| 2016/0094439 | A1 | 3/2016 | Ravindran et al. | |
| 2018/0091471 | A1* | 3/2018 | Hooda | ................ H04L 61/5014 |
| 2018/0145945 | A1* | 5/2018 | Gupta Hyde | ........... H04L 43/12 |
| 2019/0140897 | A1* | 5/2019 | Yeh | ......................... H04L 41/12 |
| 2020/0305042 | A1 | 9/2020 | Alam et al. | |
| 2020/0396583 | A1 | 12/2020 | Abouelseoud et al. | |

OTHER PUBLICATIONS

"International Application Serial No. PCT/US2021/065092, Written Opinion mailed Apr. 25, 2022", 3 pgs.

"International Application Serial No. PCT US2021 065092, International Preliminary Report on Patentability mailed Oct. 26, 2023", 5 pgs.

"NDN Packet Format Specification 0.3 documentation", [Online]. Retrieved from the Internet: URL: https: docs.named-data.net NDN-packet-spec current types.html, (updated Feb. 1, 2024), 4 pgs.

"Outdated revision 7 of NFD Developer's Guide", [Online]. Retrieved from the Internet: URL: https: named-data.net publications techreports ndn-0021-7-nfd-developer-guide , (Oct. 4, 2016), 73 pgs.

* cited by examiner

CAPABILITY DISCOVERY IN AN INFORMATION CENTRIC NETWORK

CLAIM OF PRIORITY

This patent application is a U.S. National Stage Application under 35 U.S.C. 371 from International Application No. PCT/US2021/065092, filed Dec. 23, 2021, published as WO 2022/220885, which claims the benefit of priority to United States Provisional Application Serial No. 63/173,926, titled "DYNAMIC DISCOVERY OF NODE CAPABILITY IN A WIRELESS EDGE NETWORK" and filed on Apr. 12, 2021, and also claims priority to United States Provisional Application Serial No. 63/173,940, titled "DYNAMIC DISCOVERY OF NODE CAPABILITIES IN NDN/ICN-BASED NETWORKS" and filed on Apr. 12, 2021, the entirety of all are hereby incorporated by reference herein.

TECHNICAL FIELD

Embodiments described herein generally relate to information centric networking and more specifically to capability discovery in an information centric network.

BACKGROUND

Information centric networking (ICN) is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
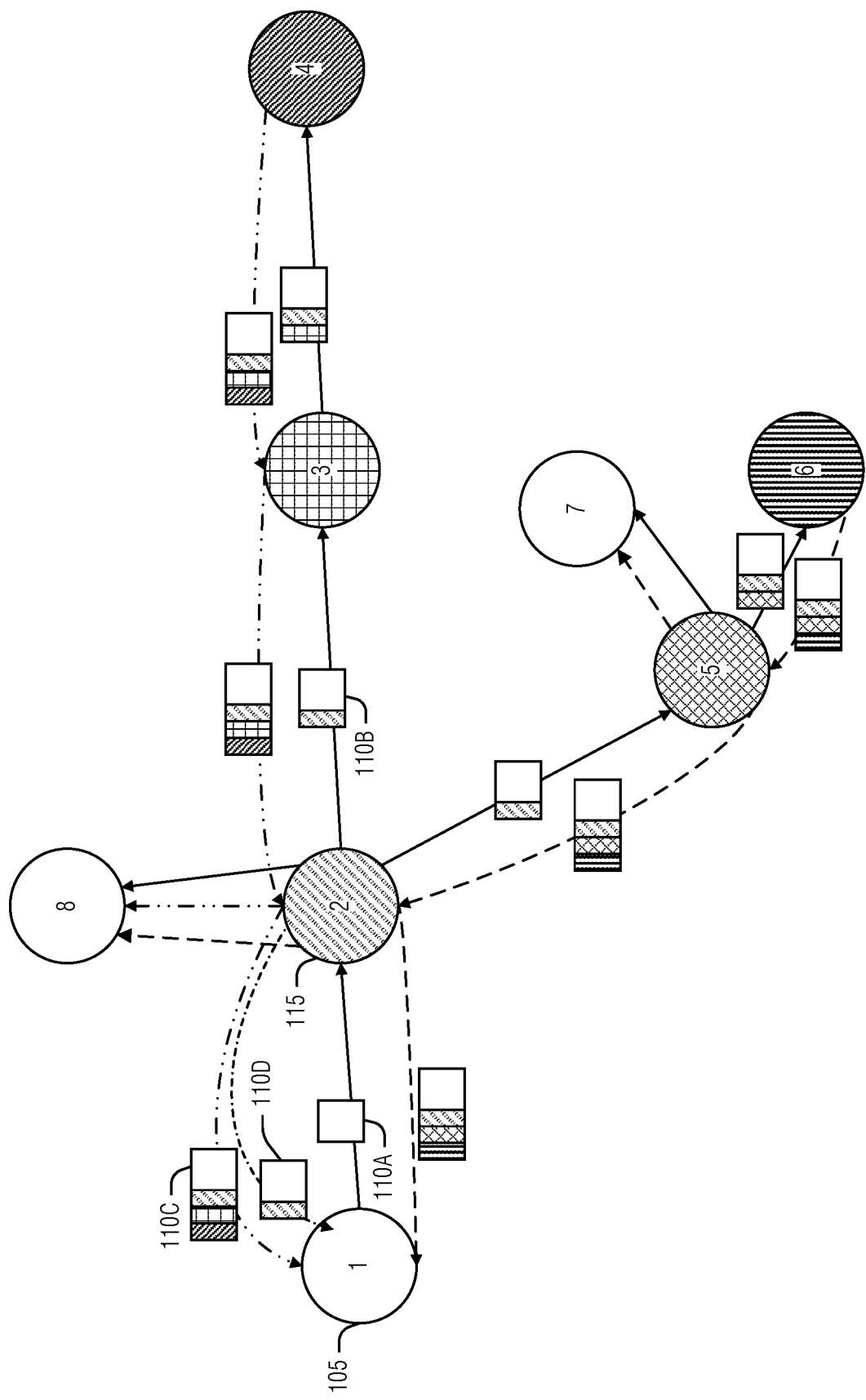
FIG. 1 is a block diagram of an example of an environment including a system for capability discovery in an information centric network, according to an embodiment.

In dynamic wireless edge networks, different nodes may have different capabilities. For example, some nodes may have compute capabilities (e.g., processing, storage, memory), some nodes may have functions (e.g., libraries, applications, etc.), and some nodes may have data (e.g., sensor data, tracking data, etc.) that may need to be processed before use. Dynamic wireless edge network environments also bring uncertainties to orchestration systems due to mobility of the wireless edge clients and changes in node capability over time, among other things. To harness locally available resources (e.g., compute, software, data, etc.) that are dynamically changing, fast (e.g., within seconds) discovery of these resources with a low (e.g., the lowest) overhead is an important consideration.

A complete orchestration procedure generally includes a sequence of task offloading procedures. Here, a task may include fetching data, fetching a function, accepting performance of a computation, etc. Some proposed approaches to fill the gap between real-time service requests from mobile clients and the dynamic network resources have focused on procedures for clients to offload the tasks to the network based on the available knowledge of the network gained through capability discovery. However, these proposals do not specify how capability discovery operates. In a network, different edge nodes often have different capabilities that need to be discovered before use. Dynamic wireless edge network environments also bring uncertainties to orchestration due to the mobility of the wireless edge node clients—e.g., moving smartphones or on-vehicle sensors, changing capabilities due to current usage upgrades in software or addition of data, etc.

If the client has knowledge or even partial knowledge about the network, the client may orchestrate the task more efficiently. Generally, broadcast-based self-learning is a mechanism to find packet delivery paths in local area networks and mobile ad-hoc networks. Here, a node broadcasts the first packet, observes where the returning packet comes from, and then creates the corresponding forwarding table entry so that future packets may be directed (e.g., unicast) to a particular wireless edge node. Such an arrangement is complicated, however, in ICN networks which generally support only discovering nodes one hop away. Moreover, the operation of interest and data packets typical in ICN networks are not natively configured to support such discovery at the network level. Although, in wireless networks, broadcast based self-learning mechanisms may find the path to a specific node with the requested capability, the mechanisms only detect the first node the discovery message reaches that may satisfy the discovery requirement.

Synchronization is a mechanism used to maintain up-to-date information between different nodes. For example, Sync protocols in ICN are designed for the use case of Publication-Subscription applications. That is, the consumers subscribe to the content producers and keep subscribed data streams or content synchronized with the producers. Some of the Sync protocols—such as ChronoSync or iSync—address full-data synchronization, while others—such as PSync—address partial-data synchronization. Generally, the consumer sends a SyncRequest which is received by the producer. The SyncRequest stays with the producer until the producer is ready to respond. Once the producer has new data generated, the producer sends out a SyncReply that carries the state digest. Each receiver then compares the new state digest with its local state digest and decides whether to fetch the data or not. For example, pSync uses an Invertible Bloom Filter (IBF) to represent the latest data names in a namespace and leverages the subtraction operation of IBF to efficiently discover the list of new data names that have been produced in the period between an old IBF and new IBF. Named-data Link State Routing protocol (NLSR), a routing protocol for wired networks, uses the pSync protocol to periodically exchange information through the Link State Announcements (LSA) that include the name-prefix LSA and the Adjacency LSA.

Both ChronoSync and PSync name each data stream using a unique stream prefix with a monotonically increasing sequence number to identify the difference between the new data stream and the old ones. This approach works well in Publication-Subscription mode because the client just keeps the sequence numbers of few producers. However, this approach does not work well on capability discovery in a distributed wireless network where each node may act as the producer once it has one or more than one capability. It is difficult to detect the capability changing based solely on the state digest because capability status is changing dynamically and multiple nodes may update their capabilities simultaneously in a distributed wireless edge network. If PSync is applied to capability information synchronization among different edge nodes, the node has to send multiple SyncRequest to different producers and wait for the SyncReply from the producer to detect capability changes. Then the node must initiate another round of the new capability fetching procedure to get the new capability, bringing extra overhead to the network and also it is time consuming.

To address the issues noted above, a discovery packet that accumulates the capability data of nodes may be used in an ICN network. This technique enables a fast and efficient mechanism to discover available resources and capabilities in ICN-based wireless edge network. The technique provides capability data of network nodes to enable a client (e.g., consumer) to select good (e.g., the best) worker nodes among discovered worker nodes for a given task offload or data selection, or other orchestration operations. The technique operates in a distributed manner, which may be helpful in highly dynamic environments. By using "contribute and benefit"—in which each node through which the discovery packet passes adds its own capabilities before forwarding the discovery packet—the capabilities of the network may be shared among various network nodes without additional overhead. The technique enables any intermediate node to contribute to the discovery procedure by appending its capability information into the discovery interest packet, thereby accumulating capability information during interest or data packet forwarding, and any node listening or overhearing the packet may learn other nodes' capabilities by reading the accumulated capability information. Additionally, in nodes with wireless transceivers, each node on the discovery packet path may listening or overhear the discovery packets and record (e.g., collect) capability information from the nodes, whether or not the node directly participates (e.g., forwards) interest or data packets during discovery. Additional details and examples are provided below.

FIG. 1 is a block diagram of an example of an environment including a system for capability discovery in an information centric network, according to an embodiment. As illustrated, a client (e.g., source) node 105 initiates a discovery process via a discovery packet 110. The discovery packet is originally without capability data (discovery packet 110A) as it is sent to node two 115. Node two 115 adds its capability data to the discovery packet, as illustrated in discovery packet 110B. As the discovery packet reaches a terminal node, such as node four, six, or eight, the discovery packet is sent back to the source node 105 with the capability data of the intervening nodes, illustrated in discovery packet 110C.

The illustrated network nodes may be smart phones, base stations, vehicles, RSUs, sensors, cameras, or other devices. The nodes may be static or moving (e.g., within a vehicle, carried by a person, etc.). The physical network infrastructure may be wired or wireless. In the case of a wireless infrastructure, wireless networks with or without infrastructure support may be used. Here, nodes may communicate using wireless technologies—such as a wireless area network (WLAN) or cellular network. In an example, base stations may be connected to one or more nodes by a wired (e.g., Ethernet) network.

The operation of the technique is presented from the perspective of the node two 115. Node two 115 includes memory (e.g., volatile or non-volatile storage or state memory), processing circuitry, and one or more network interfaces. Generally, in a wireless deployment, a single wireless transceiver will be the network interface whereas, in wired deployments, several network interfaces (e.g., Ethernet interfaces) may be used. However, any combination may also be used, such as in a cellular base station including a wireless interface and a wired interface to bridge between the cellular network and the Internet, for example.

When in operation, the processing circuitry of node two 115 is configured by design (e.g., the processing circuitry is hardwired) or software (e.g., via instructions stored in the memory), or a combination of both (e.g., as in a field programmable gate array) to implement capability discovery in an ICN. Thus, the processing circuitry is configured to receive a discovery packet 110A. In an example, the discovery packet including a discovery type corresponding to an indication of a node capability sought by a source node of the discovery packet. Discovery types may include hardware, software, a function, or data. The discovery types may include additional specificity, such as a type of video compression hardware accelerator, encryption software, or data from a specified sensor, at a particular geographic location, or of a specific subject (e.g., a road intersection). The discovery type is used to specify capability requests to enable the source node 105 to tailor discovery for particular resources. In an example, the discovery type may specify "ALL" in which the discovery packet 110A is requesting any capability of a receiving node. In an example, the discovery packet is a data packet. In an example, the discovery packet is an interest packet. The difference between the interest and the data packet is a specificity of ICN that generally does not exist in other networking paradigms. Generally, a data packet may carry the capability data as part of its payload when being sent back to the original requestor (e.g., source node 105).

The outbound interest packet version of the discovery packet 110, however, operates differently. Interest packets do not typically include a payload. Also, interest packets typically stop propagating when a node is encountered that matches the name specified in the interest packet. In order to get a broader discovery, however, this behavior is modified in the discovery packet 110. Instead of simple name matching, or discovery type matching, the interest packet version of the discovery packet 110 has a termination condition to halt forwarding of the discovery packet 110. When the termination condition is reached, a corresponding data packet version of the discovery packet 110 is returned to the source node 105 via the typical pending interest table (PIT) technique of ICNs. A variety of termination conditions may be used. For example, an expiration time, such that a receiving node of the discovery packet determines whether the expiration time (e.g., included in the discovery packet 110) has elapsed. If yes, then the data packet version of the discovery packet 110 is created and returned to the source node 105. In an example, the termination may be based on a total number of nodes that have included capability data in the discovery packet, or a total amount of discovery data. Here, a threshold of recorded resources is used to establish the termination condition.

In an example, the discovery packet includes a hop limit. Here, the hop limit is the termination condition, specifying a number of nodes through which the discovery packet 110 is to pass before being returned. In this example, a node (e.g., each node) on an outbound path from the source node modifies the hop limit to reach the termination condition upon which a last node will send the discovery packet back to the source node. Thus, the discovery packet may have a hop limit of three. When received by the node two 115, the node two 115 decrements the hop limit to two before sending the discovery packet 110B onto node three. When the discovery packet 110 reaches node four, the hop limit is decremented to zero, indicating that the discovery packet 110 is returned to the source node 105.

A consequence of overriding the typical ICN technique of returning an interest as soon as relevant (e.g., name matching) data is found may include introducing redundant discovery packets. These redundant discovery packets may result in additional overhead without additional benefit. Thus, when detected, a redundant discovery packet may be eliminated. Discovery packets are redundant when the discovery request (e.g., discovery type) contained therein is the same. However, the content of the capability data may differ depending on the path taken by the discovery packets. Different techniques may be used to select which redundant discovery packet to drop. One such technique includes dropping the discovery packet 110 with the higher hop limit—which is closer to the source node 105—and keeping the discovery packet with the lower hop limit. This behavior may be tempered by using a time window (e.g., a period of time) such that the higher hop limit packet is discarded when it is received within the time window after the receipt of the lower hop limit discovery packet. Thus, the processing circuitry is configured to receive a second discovery packet within a time period of the discovery packet 110A. In an example, the second discovery packet matches the discovery packet 110A based on the discovery type. The processing circuitry is configured to extract a second hop limit from the second discovery packet and compare the hop limit to the second hop limit to determine that the second hop limit is further from the termination condition (e.g., larger) than the hop limit. Then, the second discovery packet is discarded based on the second hop limit being further from the termination condition than the hop limit. These examples assume that the hop limit is decrementing. However, other counting techniques, such as incrementing with an upper limit, may be used to track the hop limit. In this example, the higher hop count will be closer to the termination condition.

Figure 2:
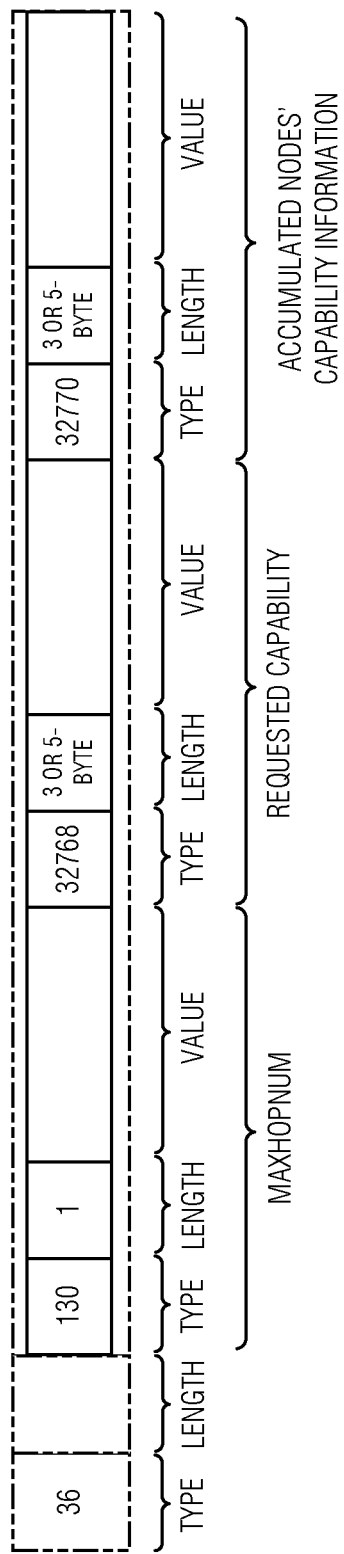
FIG. 2 illustrates an example of an ApplicationParameters field.
Figure 3:
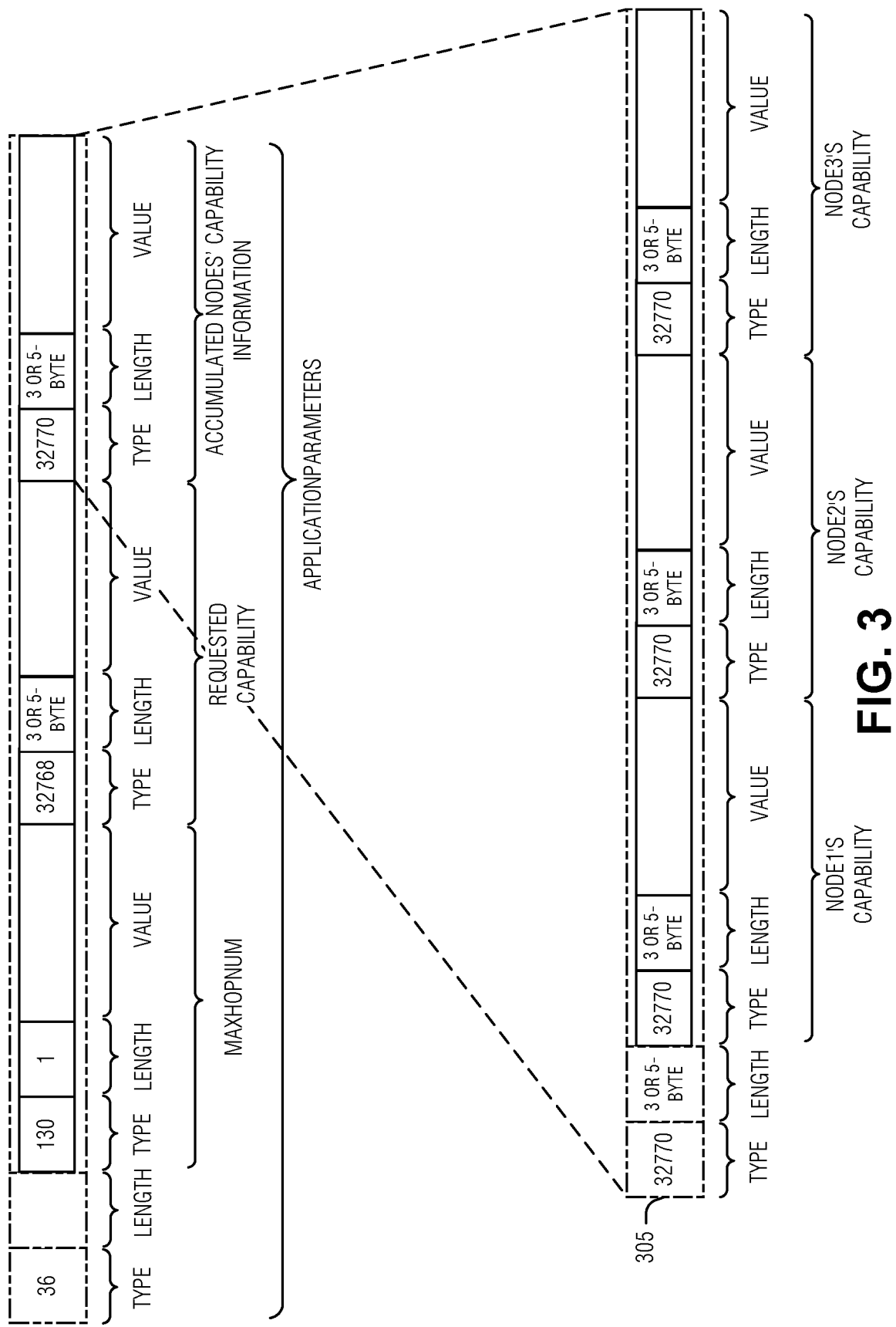
FIG. 3 illustrates an example of a nested type-length value (TLV) for node capability information.

The processing circuitry is configured to extract capability data from the discovery packet 110. As illustrated, the discovery packet 110A does not yet have capability data, but the returning data packets that pass through the node two 115 do. For the following examples, the extraction of the capability data passed to the node two 115 are called the first capability data. In an example, when the discovery packet is an interest packet, the first capability data is stored in an application parameters field of the interest packet. In an example, the application parameters field includes encoded capability data for several nodes. In these examples, the existing ICN interest packet fields are repurposed to hold the capability data. FIG. 2 illustrates the interest packet in which the ApplicationParameters field is used to store the capability information. FIG. 3 illustrates the encoding of several nodes' capability data into the ApplicationParameters field 305 of the interest packet.

Figure 4:
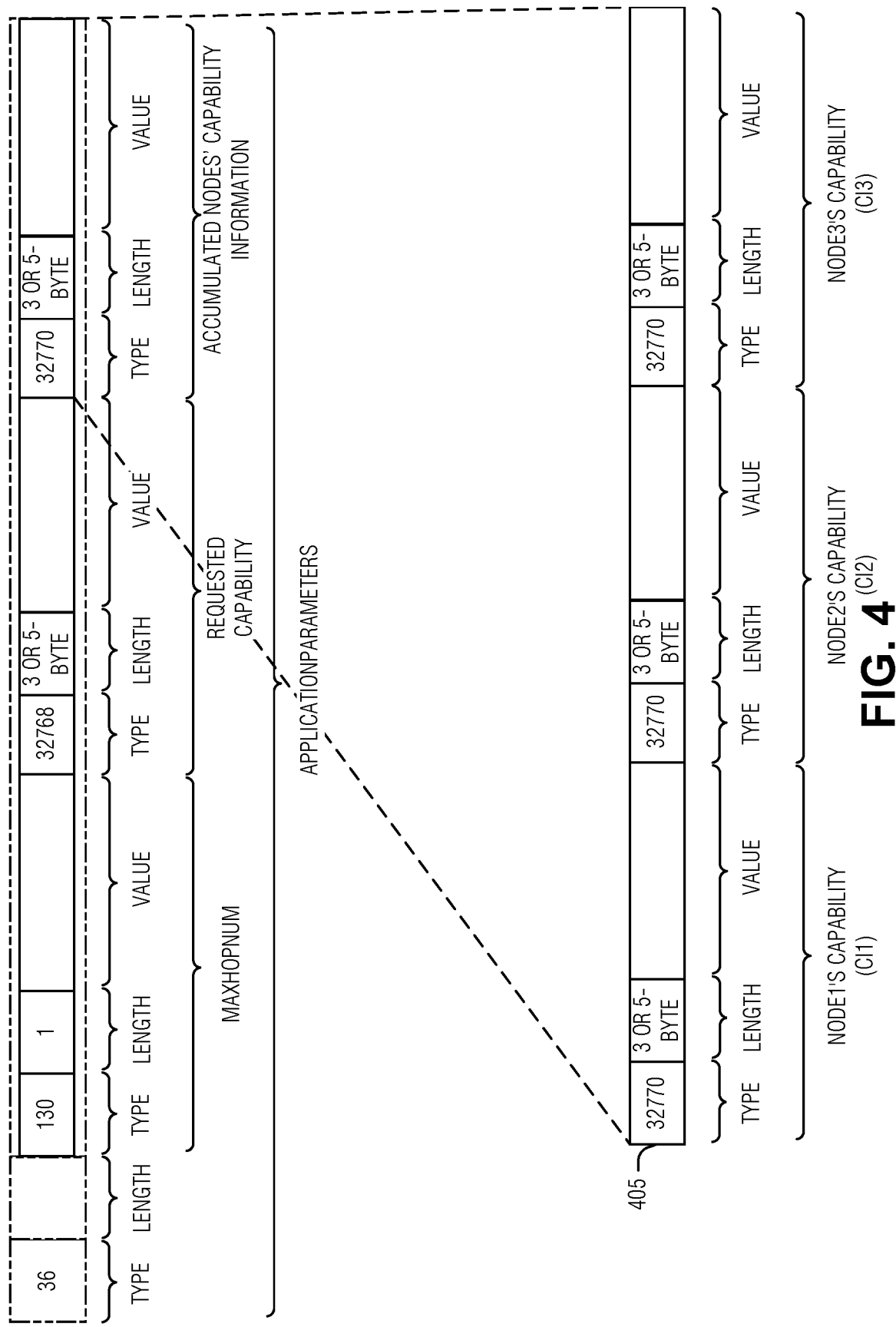
FIG. 4 illustrates an example of parallel TLV for node capability information.

In an example, when the discovery packet is an interest packet, the first capability data is stored in a capability field of the interest packet. Here, a new field is added to the interest packet to hold the capability data. In an example, the interest packet includes a separate capability field for each of several nodes that have added capability data to the discovery packet. FIG. 4 illustrates the additional node capability data fields 405 added to an interest packet.

In an example, the first capability data is a provider list. Here, the provider list includes an entry for each node that has added capability data to the discovery packet. The provider list may stand alone, essentially merely indicating a count of nodes that have the discovery type in the discovery packet 110. In an example, the provider list is in addition to capability data added by the nodes. In an example, the capability data includes a route list. In an example, the route list includes an entry for a route to nodes represented in the provider list. The route list provides nodes with an ability to select outbound interfaces to reach nodes more quickly with the capability indicated in the capability data. The inclusion of the provider list provides an additional technique to remove redundant discovery packet; drop the discovery packet with the smaller provider list. Thus, the processing circuitry may be configured to receive a second discovery packet within the time period of the discovery packet 110A—again the second discovery packet matching the discovery packet based on the discovery type— extract a second provider list from the second discovery packet and compare the provider list to the second provider list to determine that the second provider list is shorter than the provider list. Then, the processing circuitry is configured to discard the second discovery packet based on the second provider list being shorter than the provider list.

Simply dropping the redundant discovery packet may not be the most efficient as the redundant packet may include useful capability data. Thus, in an example, the capability data (e.g., including a provider list or a route list) of the redundant packets may be merged. Merging the data involves incorporating unique elements from each discovery packet 110. If there is a conflict, the conflict may be resolved by using the conflicted data from the packet that would not have been dropped in the redundancy elimination techniques described above.

The processing circuitry is configured to store the first capability data locally to the node two 115. Storing the capability data locally not only provides the node two 115 the information in case the node two 115 is a future source node (e.g., to offload a task) but also enables the node 2 115 to enhance future discovery packets with this capability data.

The processing circuitry is configured to add second capability data from the node two 115 to the discovery packet 110A to create an expanded discovery packet 110B (and discovery packet 110D). Here, the node two 115 includes its own capabilities (e.g., with respect to the discovery type) into the discovery packet 110. The node two 115 may also include capability data acquired from other discovery packets if appropriate.

The processing circuitry is configured to communicate the expanded discovery packet 110B. In an example, when the discovery packet is a data packet, communicating the expanded discovery packet 110B includes selecting an interface to communicate the expanded discovery packet 110B in accordance with a PIT entry created in response to an interest packet version of the discovery packet 110 based on the discovery type. The discovery data packet 110D is a variation in which the node two 115 immediately replies to the source node 105 is its capability data.

In an example, when the discovery packet is an interest packet, the processing circuitry is configured to communicate the expanded discovery packet 110B upon interfaces of the node two 115 other than an interface upon which the discovery packet was received. These may be referred to as outbound interfaces in this context. In an example, communicating the expanded discovery packet includes selecting an interface of the node two 115 to communication the expanded discovery packet in accordance with a forwarding information base (FIB) entry of the node two 115.

Once the discovery packet is sent on, this process is repeated at the other nodes until the termination condition is reached. Each node adding capability data, which is then shared with any node on the path out from the source node 105 and the path back to the source node 105. By avoiding requests and responses to each node, as occurs in most address-based networking techniques, the data is shared amongst more nodes with less overhead.

In accordance with the operations of the node two 115 above, the following provides a higher-level description of the arrangement. First, each node may independently broadcast a discovery packet 110 based on its own requirement and criteria. For example, a node may send the packet on demand right before a task is generated, or periodically send the discovery packet 110 based on an estimated task generation periodicity. Again, the node that originates the discovery packet 110 is the source node 105.

Second, when sending the discovery packet 110, the source node 105 may specify what type of capability it would like to discover, such as hardware (HW) only, software (SW) only, data only, or any combination of these capabilities.

Third, a provider list may be carried in each discovery packet 110. The provider list may be updated and accumulated on the way of forwarding for the discovery packet. For example, on the forwarding path, each forwarding node (e.g., forwarder) may add its own capability information into the provider list if its capability matches the discovery type. Then the forwarder may broadcast the discovery packet via outbound interfaces (e.g., not the interface upon which the discovery packet was received.

Fourth, in addition to the provider list, a route information list may be also carried in the discovery packet 110. Like the provider list, the route information list may be updated and accumulated during forwarding.

Fifth, when a node receives the discovery packet 110, the node may read and extract the capability information from the provider list regardless of whether the node will act as the forwarder to forward the packet. Similarly, the node may read and extract the route information if it is carried in the discovery packet 110. The node may correlate the route information with the node having the corresponding capability. This may enable upstream nodes to learn the capabilities of the downstream nodes.

Sixth, if there is maximum forwarding hop number (e.g., hop limit), the maximum forwarding hop number is carried in the discovery packet 110. A receiving node checks whether the current hop number meets the maximum forwarding hop number when it receives the packet. If yes, then the receiving node is the end node. A data packet version of the discovery packet, sent by the end node, carries all the accumulated capability information back to the source node 105. On the return path, nodes receiving the data packet, whether they are listening for it (e.g., nodes are on the return path and need to forward the packet to the source node 105) or overhear it (e.g., nodes are not on the return path but overhear this packet via wireless broadcast) may read the data packet to extract the capability information. In this manner, the downstream nodes acquire the capability information of the upstream nodes.

Seventh, if multiple copies of the same packet are received by one node in a same time slot, the node may use one or more of the following criteria to process the packet to reduce the redundant forwarding of the same packet. Here, the copies are discovery packets from the same source node 105 that have traversed different routes to arrive at the current node. The selection criteria may include:

1). Selecting the copy which has longest provider list and discard other copies. If there are multiple copies with the same length of provider list, select the copy which has the largest hop number. If there are still multiple copies, randomly select one of the remaining messages.
2). Selecting the copy which has largest hop number and throw away other copies. If there are multiple copies with the same length of hop number, select the copy which has the longest provider list. If there are still multiple copies left, randomly select one of the remaining copies.
3). Extracting the provider list from all received copies and aggregate them to fill a new provider list into the discovery packet 110.

Eighth, the source node 105 may set a feedback requirement if it has an urgent task to be performed. For example, if the source node 105 includes an instant-feedback flag set to 1 in the discovery packet 110, once the discovery packet 110 reaches a node which may satisfy the requirement, a data packet carrying the node's capability information is immediately sent back to source node 105. This is illustrated in FIG. 1 with the discovery packet 110D. Meanwhile, the discovery packet 110 is also forwarded in the typical manner (e.g., discovery packet 110B) may be kept forwarded to explore more available resources.

As illustrated in FIG. 1 there are eight total nodes in the topology. Node one is the source node 105, and the maximum hop number is three. There are two forwarding paths after the source node 105 broadcasts the discovery packet 110: node one→node two 115→node three→node four and node one→node two 115→node five→node six. The return paths are the reverse of the forwarding paths in accordance with ICN functionality. Lines are dashed or solid based on the source node or the end node in an exchange. Lines without return paths (e.g., those to nodes seven and eight) indicate an overheard exchange rather than a return path.

The discovery packet 110A sent by the source node 105 is marked as a blank square, if node two 115 matches the requested capability, node two 115 appends its capability to the discovery packet 110A (a diagonal striped square is appended to the blank square) to produce the discovery packet 110B and continues broadcasting discovery packet 110B until the maximum hop limit is met. Here, it is assumed that each forwarder matches the requested capability, therefore each forwarder shall append its capability to the discovery packet 110 until the complete discovery packet 110C is delivered back to the source node 105. In this example, the source node 105 set the instant-feedback flag therefore, node two 115 provides the discovery packet 110D as an immediate response to the source node 105.

When a node receives the discovery packet, the node may read and extract the capability information. Therefore, as the final result (e.g., discovery packet 110C), the source node 105 learns the capabilities of nodes two through six, node two 115 learns the capabilities of nodes three through six, node three learns the capabilities of nodes two and four, node five learns the capabilities of nodes two and six, node seven learns the capabilities of nodes two, five, and six, and node eight learns the capabilities of nodes two through six.

Without losing generality, the table below lists some of the information elements that may be carried in the discovery packet 110. However, this is not a complete list.

generally don't have a mechanism to support information accumulation along the message path during the original discovery message forwarding. Thus, because separate requests are made to each node to discover capabilities, or a separate response is given to the discovery message, efficiency of these protocols is lower than the capability accumulation discovery procedure.

A routing protocol used in wireless ad-hoc network—Dynamic Source Routing (DSR)—supports appending the identifier (ID) of the node through which the Route Request (RREQ) is traversed to the header of the RREQ. Therefore, when RREQ reaches the destination, the entire route from source to destination is available at the destination. When looking at ICN more broadly, there is no current support in ICN for information accumulation in interest packets (e.g., there is no information accumulation in upstream paths).

Although DSR discusses some accumulation, DSR is limited to routing. That is, DSR helps a source node to find a path to a destination. In contrast, capability accumulation discovery enables multiple nodes to discover other nodes capabilities beyond the end-points of a route. Thus, capability accumulation discovery differs from DSR in a number of ways:

1) DSR always assume that the source node knows the destination's address, which is not applicable in capability discovery.
2) Node ID accumulation only works when the destination is N-hop (N>1) away in DSR. In contrast, capability accumulation discovery doesn't have this limitation.

| Information element | Presence | Description |
| --- | --- | --- |
| Discovery type | M | Compute resource, function, data, or any combination of the capabilities |
| Instant Feedback | M | Source node 105 requests instant feedback once the discovery packet 110 is received by a node that satisfies the discovery type |
| Provider List | | Description of the provider list |
| > Provider ID | M | Identification of the node (e.g., node two 115) |
| > Provider Location | O | Location information which may include latitude or longitude |
| > Provider Capability | | The capabilities of the node (e.g., node two 115) |
| >> Compute Capability | O | Available compute resource |
| >> Function Capability | O | List of function names |
| >> Data Capability | O | List of data names |
| Route List | O | A route (e.g., interface) to arrive at the provider node |

Simulations have shown that the capability accumulation discovery techniques may speed up discovery efficiency by around five times compared to default ICN behavior. The following provides additional contextual details to implement the accumulation discovery technique to enable, for example, task orchestration among nodes in a dynamic environment, such as ICN-based wireless edge networks.

Some routing protocols used in wireless ad-hoc networks may help the nodes in the network to find a route to a known destination. Some of the protocols use a table driven mechanism to obtain the network topology and form the routing table in a proactive manner. These implementations often require frequent information exchange among nodes. Some protocols employ an on-demand mechanism to find routes in a reactive manner. Although these routing protocols are able to help nodes find a route to a destination, the protocols 3) Simply adding the capability information in the DSR packet header may not work in ICN or NDN protocol because DSR is designed for Internet Protocol (IP)-based networks. In contrast, implementing the feature in ICN or NDN must be done with care to minimized impact to the existing protocol use of the packet headers.

Approaches to change ICN to implement capability accumulation discovery may include an application layer assisting node capability information accumulation. Another approach may include a network layer assisted technique. In the first approach, the underlying ICN networking mechanisms are unchanged. Rather, the discovery packet 110 is delivered to an application layer service to extract the capability data and add the node's capability data before forwarding the discovery packet 110. In the second approach, the ICN mechanism itself is changed to address these features in the ICN network layer.

These approaches to modifying ICN (e.g., NDN) protocols to implement capability accumulation discovery enable faster discovery of capabilities of the network in ICN-based networks with fewer modifications to ICN protocols. Consequently, a client (e.g., source node 105) may make fast and efficient decisions on which worker (e.g., node four) among the discovered workers is most appropriate to offload a given task, choosing the best data source for data transferring to the worker, etc. These approaches may provide more flexibility when the capability accumulation discovery technique is applied in different scenarios. Further, the approaches are not limited to capability information accumulation in ICN-based networks. They may be applied to other purposes, such as route information accumulation on the way of forwarding. Also, the approaches may be implemented in networks other than named data networks (NDNs), such as content centric networks (CCNs).

Figure 5:
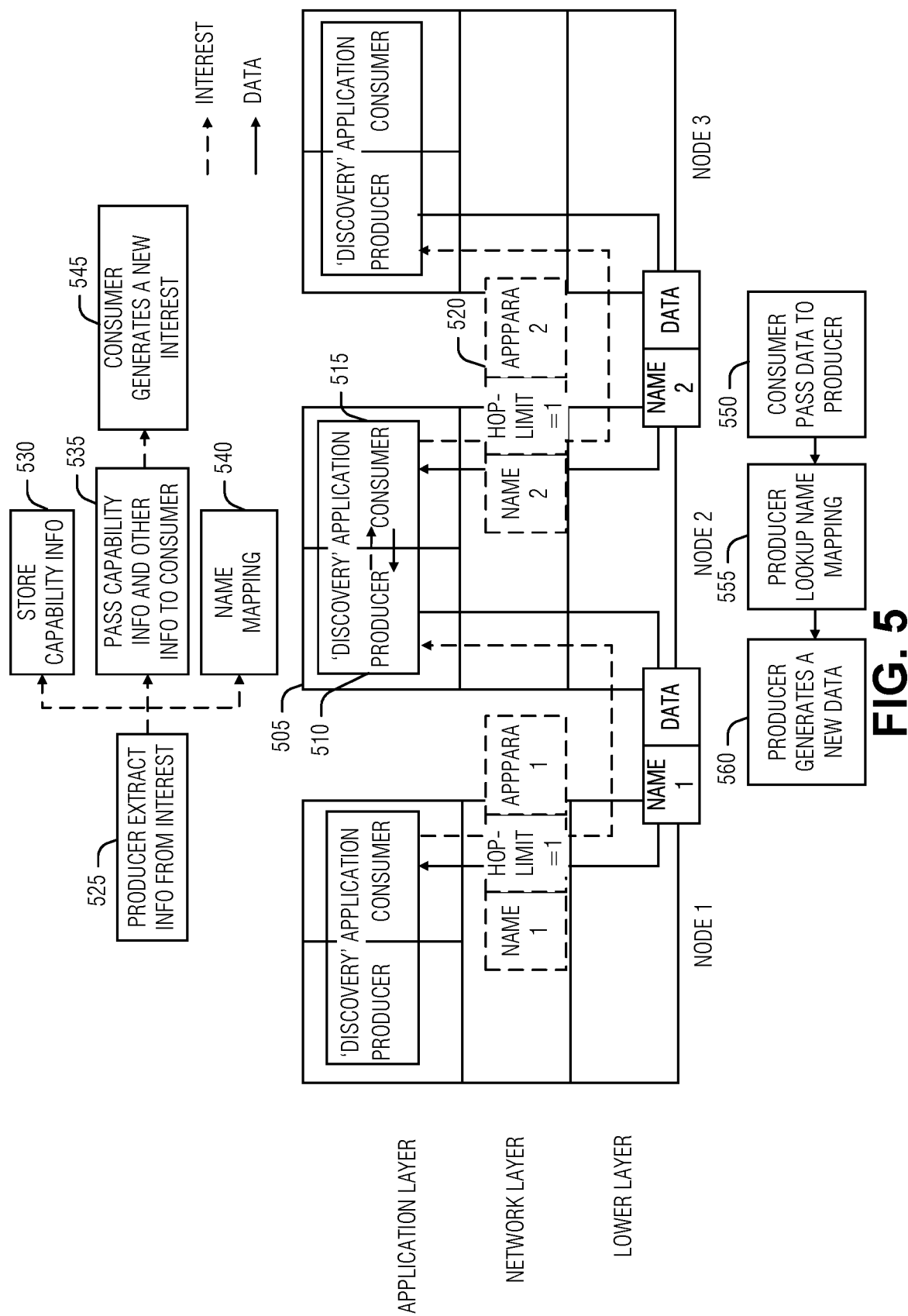
FIG. 5 illustrates an example of a procedure for interest and data packet forwarding from node to node.

FIG. 5 illustrates a procedure of interest and data packet forwarding from node to node and how the network layer and application layer handle the information exchange and forwarding. In the context of FIG. 5, consider application layer assisted capability information accumulation discovery. In this approach, each node 505 has (e.g., installs) a discovery application that works as both producer 510 and consumer component 515 components of node 505. The capability information for the node 505 (e.g., compute, function, data, etc.) may be encapsulated into the ApplicationParameters field 520 of an interest packet (e.g., discovery packet) that is created by the discovery application. The discovery application sends this interest packet to the network layer. Once received by network layer, the interest packet is forwarded to the neighboring nodes. The neighboring nodes receive the interest packet and pass it to the discovery application (e.g., in the application layer). The producer component 510 of the discovery application analyzes whether the node 505 capability matches the requested capability. The producer component 510 then instructs the consumer component 515 within the same discovery application to forward the received capability request along with its own capability information attached. The discovery application sends the accumulated capability information to the network layer with a new interest, where the accumulated capability information is encapsulated into ApplicationParameters field 520 again.

In an example, the ApplicationParameter field 520 may include a requested capability type—such as available compute resource, available function, available data, or a specific function or data, or MaxHopNum. Here, the MaxHopNum is the maximum hop number which the interest packet may be forwarded. For example, as illustrated in FIG. 5, the MaxHopNum is set to two from the node on the right. The value decremented by one in each intermediate forwarder. Capability information is then accumulated in upstream passages of the interest packet. FIG. 2 illustrates an example of the format of the ApplicationParameters field 520 in the interest packet, with the Type-Length values (TLVs) following the NDN packet format specifications. The values in FIGS. 2, 3 and 4 are given as examples by following the NDN Packet Format Specification (TLV-TYPE number assignment).

The HopLimit field in interest packets, which is an optional NDN field, is set to one because, from the network level perspective, it is intended that the interest packets from a node only go to its one hop neighboring nodes. With this setting, the network layer at the receiving node will decrease the HopLimit by one. Therefore, the HopLimit value becomes zero and the network layer must send the interest packet to the application layer (e.g., the producer component of the discovery application of the receiving node) and it cannot forward the packet to any other node.

In an example, the caching policy is disabled for the name prefix(es) used by the discovery application. An example of such a name prefix is/CapabilityDiscovery/. In an example, the producer component 510 of the discovery application decodes the content of ApplicationParameters field 520 (operation 525). The produce component 510 may then read the MaxHopNum and decreases it by one. If the new value of MaxHopNum is zero, the producer component 510 creates a data packet to return to the source node.

If the new value of MaxHopNum is greater than zero, the producer component 510 checks whether its own capability may match the requested capability type (operation 540). The producer component 510 then passes the new value of MaxHopNum, the requested capability type, received capability information—e.g., if it is present in the received interest—and its own capability to the consumer component 515 in the same node (operation 535).

If the capability information is present in the received interest, the producer component 510 may also store the received capability information (operation 530), which may be used for worker selection, data, or software download. For example, a client may make decisions on choosing the best worker among the discovered workers to offload a given task at a future time using this information.

The consumer component 515 receives the information passed by the producer component in operation 535. If the node is the first node to match the requested capability type, the consumer component 515 generates the capability information (CI) field. If not, consumer component 515 appends this node's (e.g., node 505) capability to the received capability information. The following are two examples to append the new capability information to the received one: (1) the new capability information is added as a nested TLV (e.g., FIG. 3); or (2) a new CI TLV field is added in parallel to existing CI fields in the received interest packet (e.g., FIG. 4).

The consumer component 515 then may encapsulate the new value of MaxHopNum, capability data, and requested capability type into a new ApplicationParameters field 520. Then, the consumer component 515 generates a new interest packet (operation 545) with a new name and the new ApplicationParameters field 520, which is then sent to the network layer.

As noted above, if the new value of MaxHopNum equals to zero (e.g., the termination condition is met), the producer component 510 generates a data packet (operation 560) which carries the received capability and the node 505 capability data (e.g., if its capability matches the requested capability) (operation 550). When the data packet traverses back, the application layer performs similar processing to that described above with respect to the interest packet, e.g., when the node 505 receives the data packet, it checks the PIT and knows that it needs to send the data packet to application layer. The consumer component 515 of application layer receives the data packet (operation 550), extracts the capability information (operation 555), store it, and then consumer component 515 passes the capability information to the producer component 510. The producer component 510 then generates a new data packet (operation 560) and sends it to network layer.

The intermediate nodes may store the name mappings. For example, in FIG. 5, node 505 stores mapping between name one received from the right-hand node and name two generated by the node 505. Therefore, upon receiving data from the left-hand node, the producer component 510 of the node 505 may determine which name to use for the newly generated data packet. The node 505 may store the full NameComponent of both name one and name two, including a GenericNameComponent or ParametersSha256DigestComponent. Alternatively, the node 505 may just store ParametersSha256DigestComponent to save caching resources and extract the GenericNameComponent part from name two.

Figure 6:
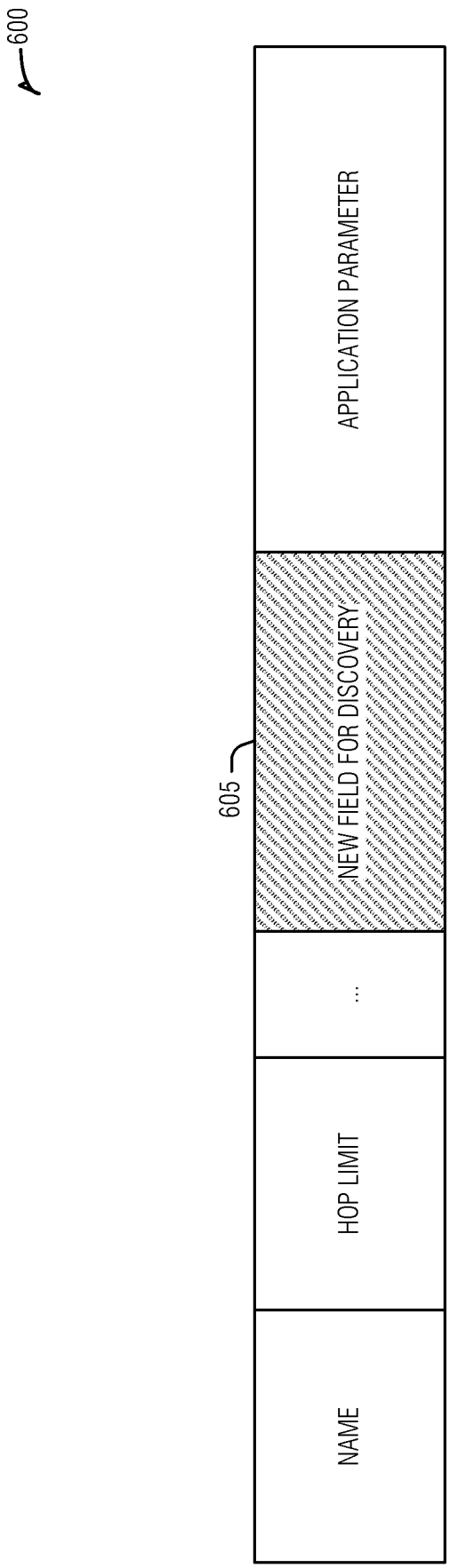
FIG. 6 illustrates an example interest packet format.

A network layer assisted capability information accumulation approach may be used instead of the application layer technique described above, or in addition to that technique. In this approach, the capability information accumulation is handled by network layer. A given node's capability information is inserted into the interest packet 600 by adding a new field 605, such as that illustrated in FIG. 6. In an example, this approach involves trust among all nodes so that the content of discovery information is not compromised (e.g., not changed accidently or maliciously). When a node with this approach enabled receives the interest packet, the node knows how to handle this new field, for example, by reading or extracting the discovery information from this new field and appending its own capability information to this new field. If this node does not support this approach, it treats the received interest packet as a regular ICN interest packet—e.g., ignoring the field 605—and forwards the interest packet based on the forwarding policies it has enabled.

Figure 7:
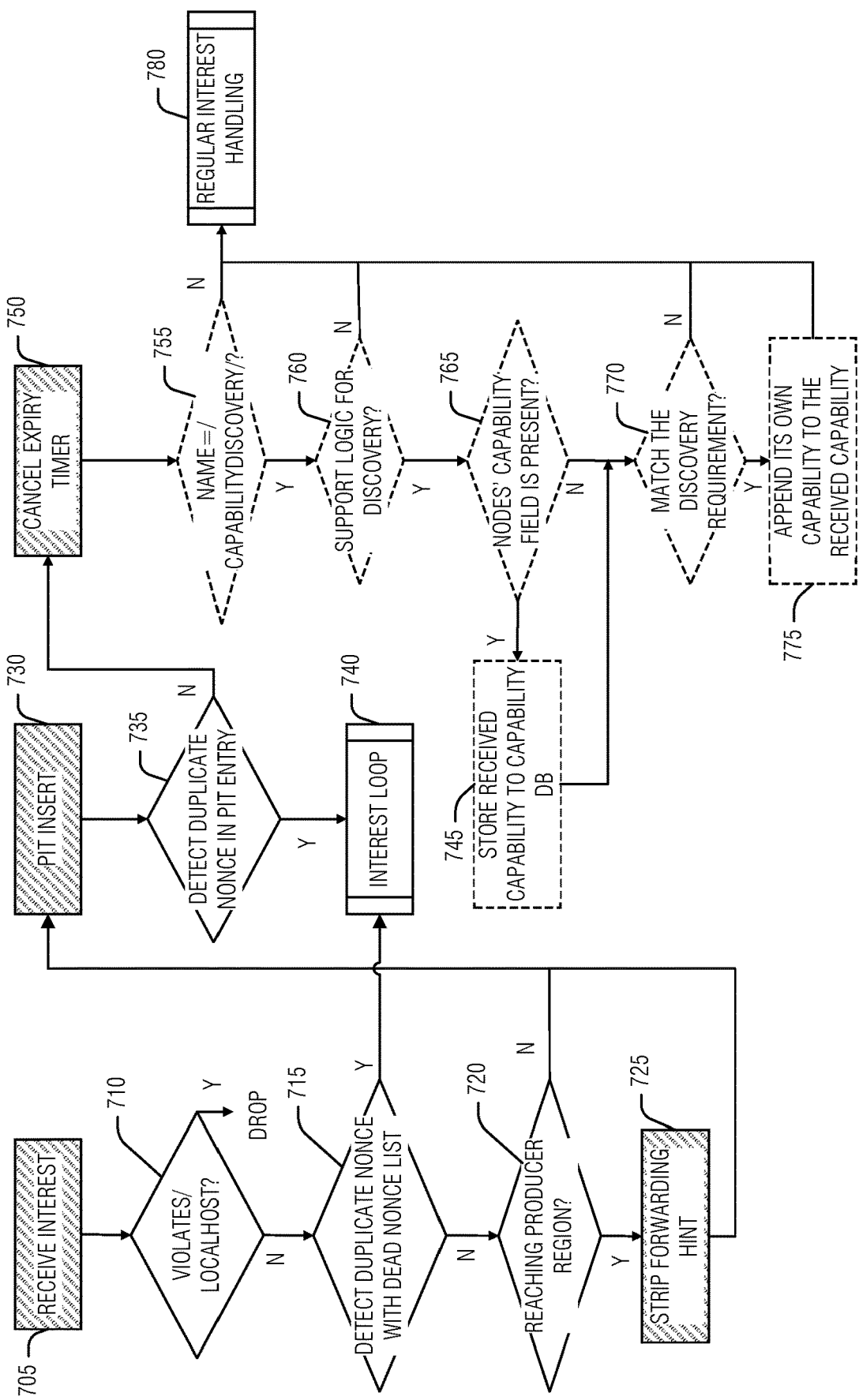
FIG. 7 illustrates an example of an incoming interest pipeline to support capability information accumulation.

FIG. 7 illustrates an example of an incoming interest pipeline to support capability information accumulation. An intertest packet is received (operation 705). If the interest packet violates a criterion (e.g., trust) of the localhost, the packet is dropped (decision 710). Otherwise, if the packet is a duplicate based on a list of known duplicates (decision 715), the packet is sent to the interest loop (operation 740) to incorporate into local capability data if applicable. Otherwise, the packet is tested to determine whether a forwarding hint indicates that the receiving node is in the receiving region (decision 720). If yes, the hint is stripped (operation 725). The packet is then inserted into the PIT (operation 730). The PIT entry is used to ascertain whether there is another PIT entry indicating a duplicate (decision 735). If yes, the packet is sent to the interest loop (operation 740). Otherwise, an expiration timer is reset (operation 750).

The following operations, illustrated with dashed lines, are the modifications to the standard ICN interest handling to enable the discovery packets described herein. Thus, the interest is tested to determine if it is a discovery packet (decision 755). If no, the packet is handed off the standard interest procedure (operation 780). If yes, the node determines whether or not it may respond to the discovery packet (decision 760). If yes, the node determines whether the interest has node capability data (decision 765). If yes, the capability data is stored locally (operation 745). The node then determines whether it has capabilities that match the discovery interest (decision 770). If yes, the node appends its capabilities onto the interest packet (operation 775), which then continues to the standard interest packet handling procedure (operation 750).

Figure 8:
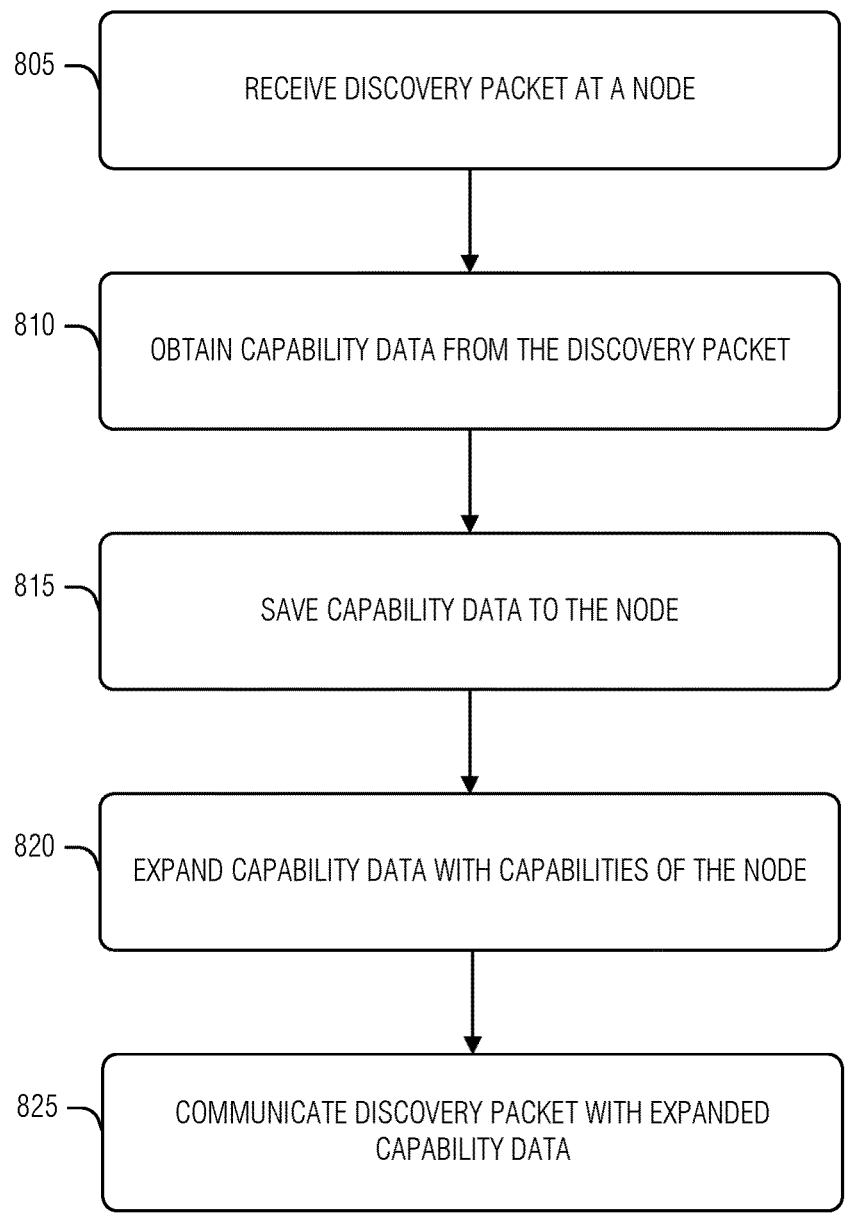
FIG. 8 illustrates a flow diagram of an example of a method for capability discovery in an information centric network, according to an embodiment.

FIG. 8 illustrates a flow diagram of an example of a method 800 for capability discovery in an information centric network, according to an embodiment. The operations of the method 800 are performed by computer hardware, such as that described above or below (e.g., processing circuitry).

At operation 805, discovery packet is received at an ICN node. In an example, the discovery packet includes a discovery type corresponding to an indication of a node capability sought by a source node of the discovery packet. In an example, the discovery packet is a data packet. In an example, the discovery packet is an interest packet.

In an example, the discovery packet includes a hop limit. In this example, a node (e.g., each node) on an outbound path from the source node modifies the hop limit to reach a termination condition upon which a last node will send the discovery packet back to the source node. In an example, the method 800 includes receiving a second discovery packet within a time period of the discovery packet. Here, the second discovery packet matches the discovery packet based on the discovery type. The method 800 proceeds by extracting a second hop limit from the second discovery packet and comparing the hop limit to the second hop limit to determine that the second hop limit is further from the termination condition than the hop limit. Then, the second discovery packet is discarded based on the second hop limit being further from the termination condition than the hop limit.

At operation 810, first capability data from an intermediate node is extracted from the discovery packet. In an example, when the discovery packet is an interest packet, the first capability data is stored in an application parameters field of the interest packet. In an example, the application parameters field includes encoded capability data for several nodes. In an example, when the discovery packet is an interest packet, the first capability data is stored in a capability field of the interest packet. In an example, the interest packet includes a separate capability field for each of several nodes that have added capability data to the discovery packet.

In an example, the first capability data is a provider list. Here, the provider list includes an entry for each node that has added capability data to the discovery packet. In an example, the method 800 may include the additional operations of receiving a second discovery packet within a time period of the discovery packet—the second discovery packet matching the discovery packet based on the discovery type—extracting a second provider list from the second discovery packet, and comparing the provider list to the second provider list to determine that the second provider list is shorter than the provider list. At this juncture, the method 800 proceeds by discarding the second discovery packet based on the second provider list being shorter than the provider list.

In an example, where the first capability data includes a provider list, the method 800 may include the operations of receiving a second discovery packet within a time period of the discovery packet. Here, the second discovery packet matches the discovery packet based on the discovery type. Then, the method 800 continues by extracting a second provider list from the second discovery packet and merging the second provider list into the provider list. The merged provider list is then stored in the ICN node (operation 815) and used in the expanded discovery packet (operation 820).

In an example, the capability data includes a route list. In an example, the route list includes an entry for a route to nodes represented in the provider list.

At operation 815, the first capability data is stored locally to the ICN node.

At operation 820, second capability data from the ICN node is added to the discovery packet to create an expanded discovery packet.

At operation 825, the expanded discovery packet is communicated. In an example, when the discovery packet is a data packet, communicating the expanded discovery packet includes selecting an interface of the ICN node to communicate the expanded discovery packet in accordance with a pending interest table (PIT) entry. In an example, the PIT entry was created in response to an interest packet version of the discovery packet based on the discovery type.

In an example, when the discovery packet is an interest packet, communicating the expanded discovery packet includes communicating the expanded discovery packet upon interfaces of the ICN node other than an interface upon which the discovery packet was received. In an example, communicating the expanded discovery packet includes selecting an interface of the ICN to communication the expanded discovery packet in accordance with a forwarding information base (FIB) entry of the ICN node.

Figure 9:
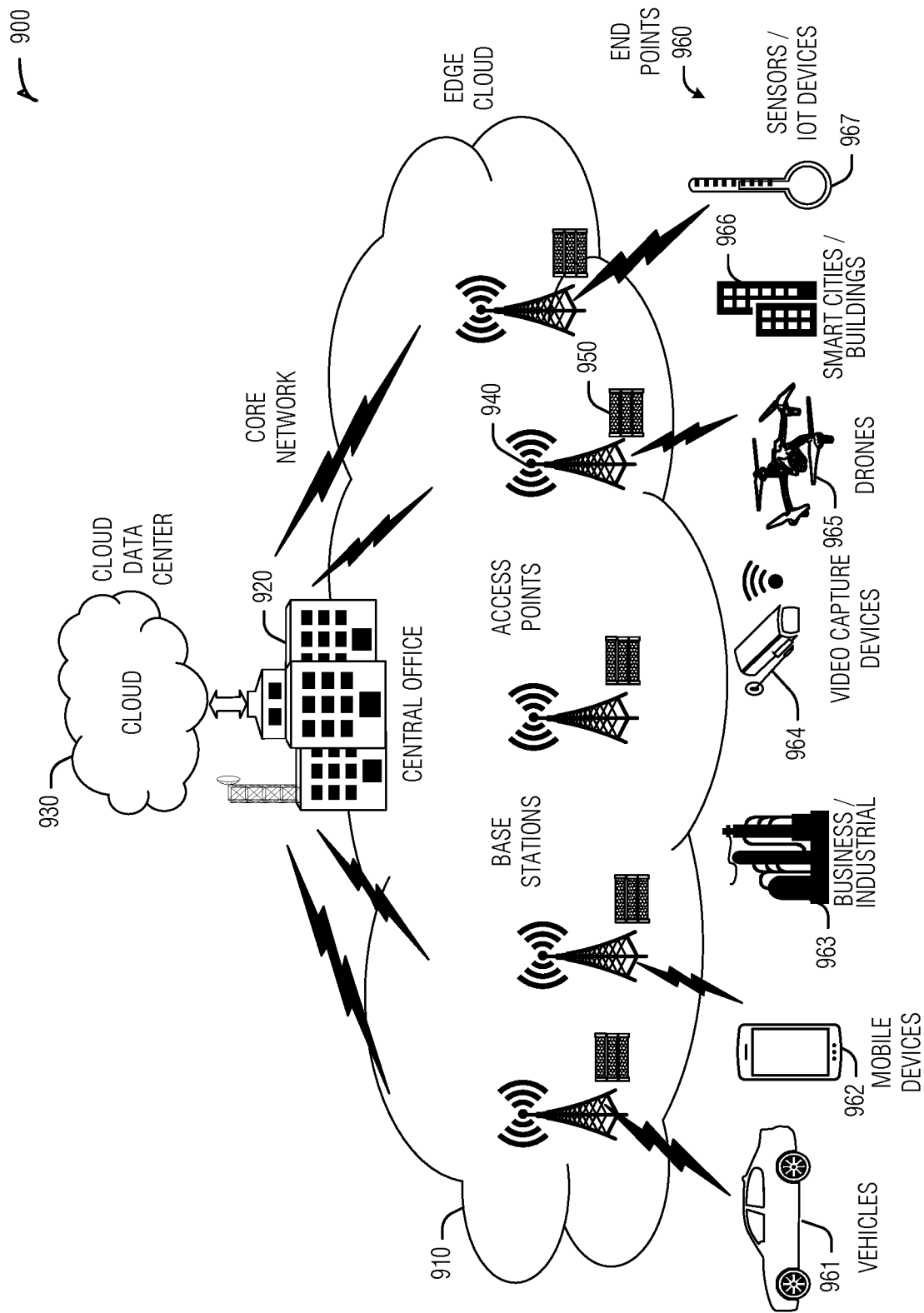
FIG. 9 illustrates operational layers among endpoints, an edge cloud, and cloud computing environments.

The following paragraphs provide a general overview of edge computing, as discussed or deployed with the ICN techniques herein. FIG. 9 is a block diagram 900 showing an overview of a configuration for edge computing, which includes a layer of processing referred to in many of the following examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and IoT devices 967, etc.) than the cloud data center 930. Compute, memory, and storage resources which are offered at the edges in the edge cloud 910 are critical to providing ultra-low latency response times for services and functions used by the endpoint data sources 960 as well as reduce network backhaul traffic from the edge cloud 910 toward cloud data center 930 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 10:
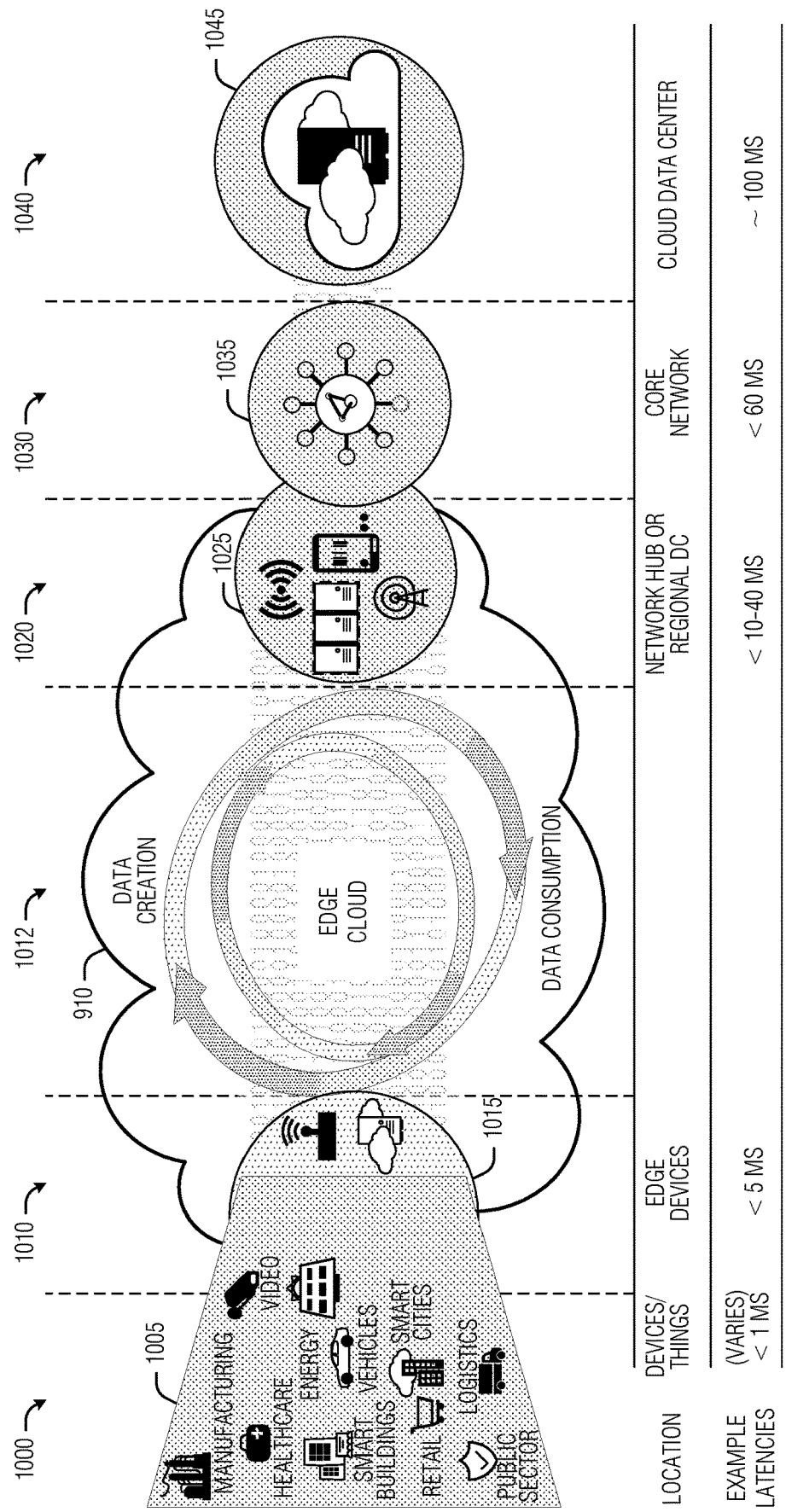
FIG. 10 illustrates an overview of an edge cloud configuration for edge computing.

FIG. 10 illustrates operational layers among endpoints, an edge cloud, and cloud computing environments. Specifically, FIG. 10 depicts examples of computational use cases 1005, utilizing the edge cloud 910 among multiple illustrative layers of network computing. The layers begin at an endpoint (devices and things) layer 1000, which accesses the edge cloud 910 to conduct data creation, analysis, and data consumption activities. The edge cloud 910 may span multiple network layers, such as an edge devices layer 1010 having gateways, on-premise servers, or network equipment (nodes 1015) located in physically proximate edge systems; a network access layer 1020, encompassing base stations, radio processing units, network hubs, regional data centers (DC), or local network equipment (equipment 1025); and any equipment, devices, or nodes located therebetween (in layer 1012, not illustrated in detail). The network communications within the edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the edge devices layer 1010, to even between 10 to 40 ms when communicating with nodes at the network access layer 1020. Beyond the edge cloud 910 are core network 1030 and cloud data center 1040 layers, each with increasing latency (e.g., between 50-60 ms at the core network layer 1030, to 100 or more ms at the cloud data center layer). As a result, operations at a core network data center 1035 or a cloud data center 1045, with latencies of at least 50 to 100 ms or more, will not be able to accomplish many time-critical functions of the use cases 1005. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1035 or a cloud data center 1045, a central office or content data network may be considered as being located within a "near edge" layer ("near" to the cloud, having high latency values when communicating with the devices and endpoints of the use cases 1005), whereas an access point, base station, on-premise server, or network gateway may be considered as located within a "far edge" layer ("far" from the cloud, having low latency values when communicating with the devices and endpoints of the use cases 1005). It will be understood that other categorizations of a particular network layer as constituting a "close", "local", "near", "middle", or "far" edge may be based on latency, distance, number of network hops, or other measurable characteristics, as measured from a source in any of the network layers 1000-1040.

The various use cases 1005 may access resources under usage pressure from incoming streams, due to multiple services utilizing the edge cloud. To achieve results with low latency, the services executed within the edge cloud 910 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 910 may provide the ability to serve and respond to multiple applications of the use cases 1005 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 910 (network layers 1000-1040), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 910.

As such, the edge cloud 910 is formed from network components and functional features operated by and within edge gateway nodes, edge aggregation nodes, or other edge compute nodes among network layers 1010-1030. The edge cloud 910 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 910 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 910 may be servers, multi-tenant servers, appliance computing devices, and/or any other type of computing devices. For example, the edge cloud 910 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 910 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 11:
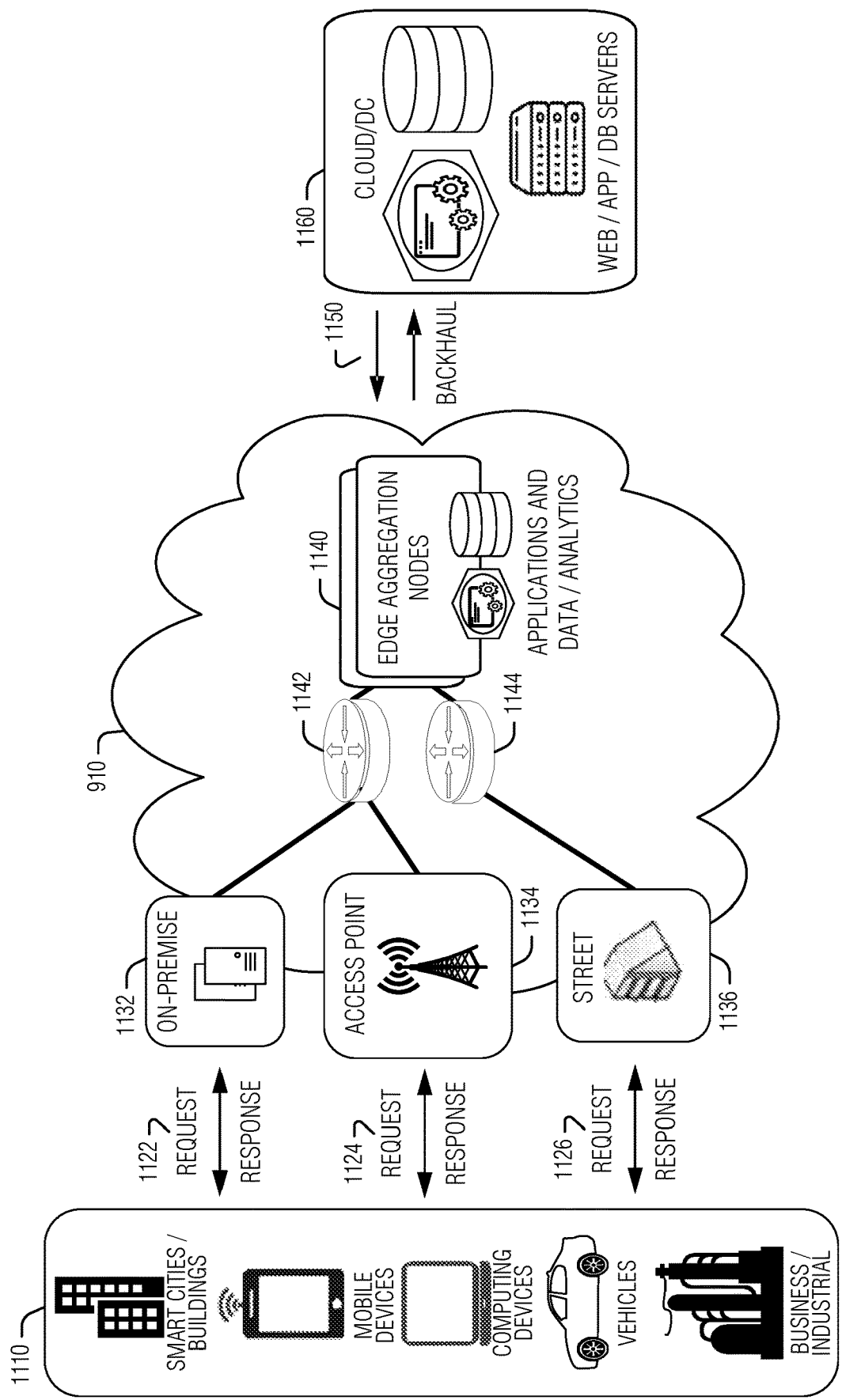
FIG. 11 illustrates an example approach for networking and services in an edge computing system.

In FIG. 11, various client endpoints 1110 (in the form of mobile devices, computers, autonomous vehicles, business computing equipment, industrial processing equipment) exchange requests and responses that are specific to the type of endpoint network aggregation. For instance, client endpoints 1110 may obtain network access via a wired broadband network, by exchanging requests and responses 1122 through an on-premise network system 1132. Some client endpoints 1110, such as mobile computing devices, may obtain network access via a wireless broadband network, by exchanging requests and responses 1124 through an access point (e.g., cellular network tower) 1134. Some client endpoints 1110, such as autonomous vehicles may obtain network access for requests and responses 1126 via a wireless vehicular network through a street-located network system 1136. However, regardless of the type of network access, the TSP may deploy aggregation points 1142, 1144 within the edge cloud 910 to aggregate traffic and requests. Thus, within the edge cloud 910, the TSP may deploy various compute and storage resources, such as at edge aggregation nodes 1140, to provide requested content. The edge aggregation nodes 1140 and other systems of the edge cloud 910 are connected to a cloud or data center 1160, which uses a backhaul network 1150 to fulfill higher-latency requests from a cloud/data center for websites, applications, database servers, etc. Additional or consolidated instances of the edge aggregation nodes 1140 and the aggregation points 1142, 1144, including those deployed on a single server framework, may also be present within the edge cloud 910 or other areas of the TSP infrastructure.

Figure 12:
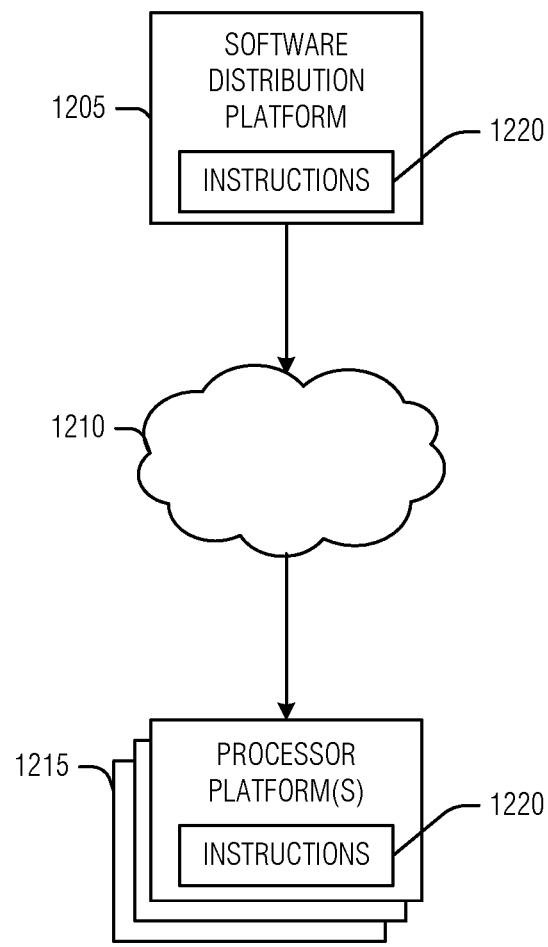
FIG. 12 illustrates an example software distribution platform to distribute software.

FIG. 12 illustrates an example software distribution platform 1205 to distribute software, such as the example computer readable instructions 1220 of FIG. 12, to one or more devices, such as example processor platform(s) 1200 or connected edge devices. The example software distribution platform 1205 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1205). Example connected edge devices may operate in commercial or home automation environments. In some examples, a third party is a developer, a seller, or a licensor of software such as the example computer readable instructions 1220 of FIG. 12. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 12, the software distribution platform 1205 includes one or more servers and one or more storage devices. The storage devices store the computer readable instructions 1220, which may correspond to the example computer readable instructions illustrated in the figures and described herein. The one or more servers of the example software distribution platform 1205 are in communication with a network 1210, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1220 from the software distribution platform 1205. For example, the software, which may correspond to the example computer readable instructions described herein, may be downloaded to the example processor platform(s) 1200 (e.g., example connected edge devices), which are to execute the computer readable instructions 1220 to implement the technique. In some examples, one or more servers of the software distribution platform 1205 are communicatively connected to one or more security domains or security devices through which requests and transmissions of the example computer readable instructions 1220 must pass. In some examples, one or more servers of the software distribution platform 1205 periodically offer, transmit, or force updates to the software (e.g., the example computer readable instructions 1220 of FIG. 12) to ensure improvements, patches, updates, etc. are distributed and applied to the software at the end user devices.

In the illustrated example of FIG. 12, the computer readable instructions 1220 are stored on storage devices of the software distribution platform 1205 in a particular format. A format of computer readable instructions includes, but is not limited to a particular code language (e.g., Java, JavaScript, Python, C, C #, SQL, HTML, etc.), or a particular code state (e.g., uncompiled code (e.g., ASCII), interpreted code, linked code, executable code (e.g., a binary), etc.). In some examples, the computer readable instructions 1220 stored in the software distribution platform 1205 are in a first format when transmitted to the example processor platform(s) 1200. In some examples, the first format is an executable binary in which particular types of the processor platform(s) 1200 can execute. However, in some examples, the first format is uncompiled code that requires one or more preparation tasks to transform the first format to a second format to enable execution on the example processor platform(s) 1200. For instance, the receiving processor platform(s) 1200 may need to compile the computer readable instructions 1220 in the first format to generate executable code in a second format that is capable of being executed on the processor platform(s) 1200. In still other examples, the first format is interpreted code that, upon reaching the processor platform(s) 1200, is interpreted by an interpreter to facilitate execution of instructions.

Figure 13:
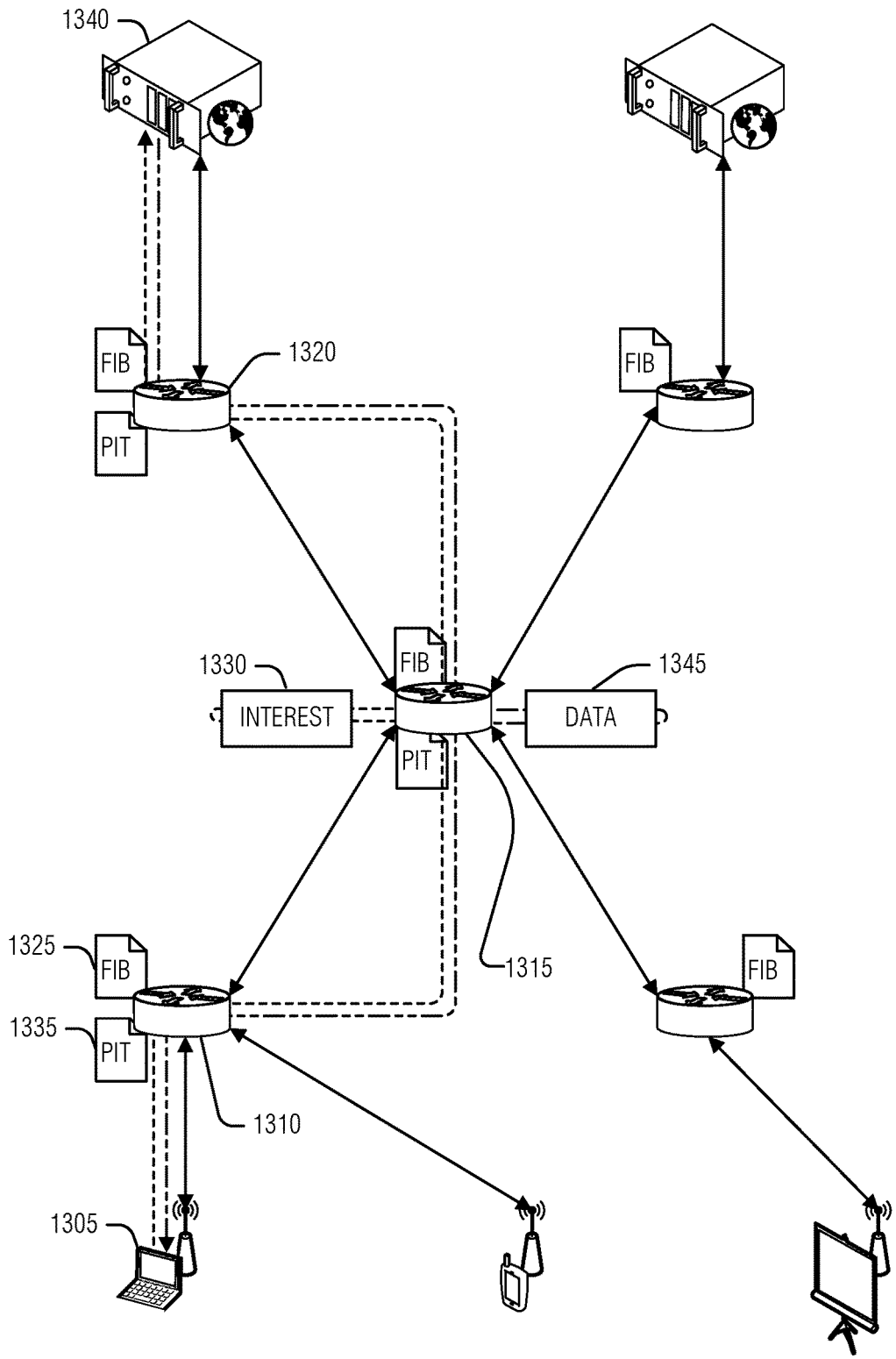
FIG. 13 illustrates an example information centric network (ICN), according to an example.

FIG. 13 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1305 (e.g., subscriber) requests named content from the network itself. The content request may be called an interest and transmitted via an interest packet 1330. As the interest packet traverses network devices (e.g., network elements, routers, switches, hubs, etc.)—such as network elements 1310, 1315, and 1320—a record of the interest is kept, for example, in a pending interest table (PIT) at each network element. Thus, network element 1310 maintains an entry in its PIT 1335 for the interest packet 1330, network element 1315 maintains the entry in its PIT, and network element 1320 maintains the entry in its PIT.

When a device, such as publisher 1340, that has content matching the name in the interest packet 1330 is encountered, that device 1340 may send a data packet 1345 in response to the interest packet 1330. Typically, the data packet 1345 is tracked back through the network to the source (e.g., device 1305) by following the traces of the interest packet 1330 left in the network element PITs. Thus, the PIT 1335 at each network element establishes a trail back to the subscriber 1305 for the data packet 1345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1330 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1330 to data cached in the ICN element. Thus, for example, if the data 1345 named in the interest 1330 is cached in network element 1315, then the network element 1315 will return the data 1345 to the subscriber 1305 via the network element 1310. However, if the data 1345 is not cached at network element 1315, the network element 1315 routes the interest 1330 on (e.g., to network element 1320). To facilitate routing, the network elements may use a forwarding information base 1325 (FIB) to match named data to an interface (e.g., physical port) for the route. Thus, the FIB 1325 operates much like a routing table on a traditional network device.

In an example, additional meta-data may be attached to the interest packet 1330, the cached data, or the route (e.g., in the FIB 1325), to provide an additional level of matching. For example, the data name may be specified as "www.somedomain.com or videos or v8675309," but also include a version number—or timestamp, time range, endorsement, etc. In this example, the interest packet 1330 may specify the desired name, the version number, or the version range. The matching may then locate routes or cached data matching the name and perform the additional comparison of meta-data or the like to arrive at an ultimate decision as to whether data or a route matches the interest packet 1330 for respectively responding to the interest packet 1330 with the data packet 1345 or forwarding the interest packet 1330.

ICN has advantages over host-based networking because the data segments are individually named. This enables aggressive caching throughout the network as a network element may provide a data packet 1330 in response to an interest 1330 as easily as an original author 1340. Accordingly, it is less likely that the same segment of the network will transmit duplicates of the same data requested by different devices.

Fine grained encryption is another feature of many ICN networks. A typical data packet 1345 includes a name for the data that matches the name in the interest packet 1330. Further, the data packet 1345 includes the requested data and may include additional information to filter similarly named data (e.g., by creation time, expiration time, version, etc.). To address malicious entities providing false information under the same name, the data packet 1345 may also encrypt its contents with a publisher key or provide a cryptographic hash of the data and the name. Thus, knowing the key (e.g., from a certificate of an expected publisher 1340) enables the recipient to ascertain whether the data is from that publisher 1340. This technique also facilitates the aggressive caching of the data packets 1345 throughout the network because each data packet 1345 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 14:
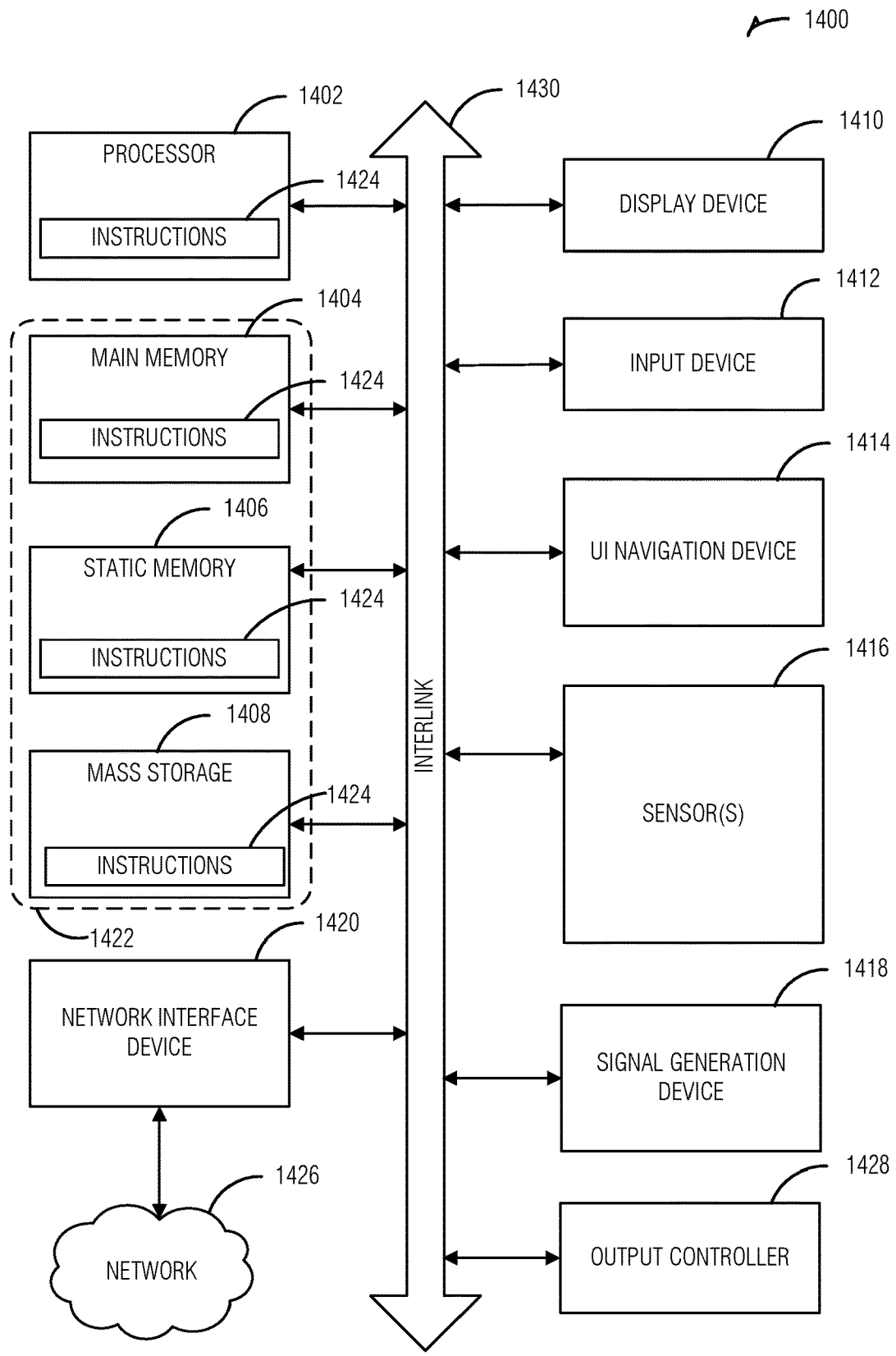
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UEFI), etc.) 1406, and mass storage 1408 (e.g., hard drives, tape drives, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1422 may be representative of the instructions 1424, such as instructions 1424 themselves or a format from which the instructions 1424 may be derived. This format from which the instructions 1424 may be derived may include source code, encoded instructions (e.g., in compressed or encrypted form), packaged instructions (e.g., split into multiple packages), or the like. The information representative of the instructions 1424 in the machine readable medium 1422 may be processed by processing circuitry into the instructions to implement any of the operations discussed herein. For example, deriving the instructions 1424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 may include assembly, compilation, or interpretation of the information (e.g., by the processing circuitry) to create the instructions 1424 from some intermediate or preprocessed format provided by the machine readable medium 1422. The information, when provided in multiple parts, may be combined, unpacked, and modified to create the instructions 1424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards, IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UEFI), etc.) 1406, and mass storage 1408 (e.g., hard drives, tape drives, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1422 may be representative of the instructions 1424, such as instructions 1424 themselves or a format from which the instructions 1424 may be derived. This format from which the instructions 1424 may be derived may include source code, encoded instructions (e.g., in compressed or encrypted form), packaged instructions (e.g., split into multiple packages), or the like. The information representative of the instructions 1424 in the machine readable medium 1422 may be processed by processing circuitry into the instructions to implement any of the operations discussed herein. For example, deriving the instructions 1424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 may include assembly, compilation, or interpretation of the information (e.g., by the processing circuitry) to create the instructions 1424 from some intermediate or preprocessed format provided by the machine readable medium 1422. The information, when provided in multiple parts, may be combined, unpacked, and modified to create the instructions 1424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

ADDITIONAL NOTES & EXAMPLES

Example 1 is an ICN node comprising: a first network interface; a second network interface; a memory; and processing circuitry configured to: receive a discovery packet on the first network interface, the discovery packet including a discovery type corresponding to an indication of a node capability requested by a source node of the discovery packet; extracting, from the discovery packet, first capability data from an intermediate node; storing the first capability data locally in the memory; adding, to the discovery packet, second capability data from the ICN node to create an expanded discovery packet; and communicating the expanded discovery packet on the second network interface.

In Example 2, the subject matter of Example 1 includes, wherein the discovery packet is a data packet.

In Example 3, the subject matter of Example 2 includes, wherein, to communicate the expanded discovery packet, the processing circuitry is configured to selected the second network interface from multiple network interfaces to communicate the expanded discovery packet in accordance with a pending interest table (PIT) entry.

In Example 4, the subject matter of Example 3 includes, wherein the PIT entry was created in response to an interest packet version of the discovery packet that corresponded to the discovery packet based on the discovery type.

In Example 5, the subject matter of Examples 1–4 includes, wherein the discovery packet is an interest packet.

In Example 6, the subject matter of Example 5 includes, wherein, to communicate the expanded discovery packet, the processing circuitry is configured to communicate the expanded discovery packet upon interfaces of the ICN node other than the first network interface upon which the discovery packet was received.

In Example 7, the subject matter of Examples 5-6 includes, wherein, to communicate the expanded discovery packet, the processing circuitry is configured to select the second network interface from multiple interfaces to communicate the expanded discovery packet in accordance with a forwarding information base (FIB) entry of the ICN node.

In Example 8, the subject matter of Examples 5-7 includes, wherein the first capability data is stored in an application parameters field of the interest packet.

In Example 9, the subject matter of Example 8 includes, wherein the application parameters field includes encoded capability data for several nodes.

In Example 10, the subject matter of Examples 5-9 includes, wherein the first capability data is stored in a capability field of the interest packet.

In Example 11, the subject matter of Example 10 includes, wherein the interest packet includes a separate capability field for each of several nodes that have added capability data to the discovery packet.

In Example 12, the subject matter of Examples 1-11 includes, wherein the first capability data is a provider list, the provider list including an entry for each node that has added capability data to the discovery packet.

In Example 13, the subject matter of Example 12 includes, wherein the processing circuitry is configured to: receive, via any network interface of the ICN node, a second discovery packet within a time period of the discovery packet, the second discovery packet matching the discovery packet based on the discovery type; extract a second provider list from the second discovery packet; compare the provider list to the second provider list to determine that the second provider list is shorter than the provider list; and discard the second discovery packet based on the second provider list being shorter than the provider list.

In Example 14, the subject matter of Examples 12-13 includes, wherein the processing circuitry is configured to: receive, via any network interface of the ICN node, a second discovery packet within a time period of the discovery packet, the second discovery packet matching the discovery packet based on the discovery type; extract a second provider list from the second discovery packet; and merge the second provider list into the provider list, wherein the provider list after the merge is stored in the memory and used in the expanded discovery packet.

In Example 15, the subject matter of Examples 12-14 includes, wherein the first capability data includes a route list, the route list including an entry for a route to nodes represented in the provider list.

In Example 16, the subject matter of Examples 1-15 includes, wherein the discovery packet includes a hop limit, each node on an outbound path from the source node modifying the hop limit to reach a termination condition upon which a last node will send the discovery packet back to the source node.

In Example 17, the subject matter of Example 16 includes, wherein the processing circuitry is configured to: receive, via any network interface of the ICN node, a second discovery packet within a time period of the discovery packet, the second discovery packet matching the discovery packet based on the discovery type; extract a second hop limit from the second discovery packet; compare the hop limit to the second hop limit to determine that the second hop limit is further from the termination condition than the hop limit; and discard the second discovery packet based on the second hop limit being further from the termination condition than the hop limit.

Example 18 is a method for capability discovery in an information centric network (ICN), the method comprising: receiving, at an ICN node, a discovery packet, the discovery packet including a discovery type corresponding to an indication of a node capability requested by a source node of the discovery packet; extracting, from the discovery packet, first capability data from an intermediate node; storing the first capability data locally to the ICN node; adding, to the discovery packet, second capability data from the ICN node to create an expanded discovery packet; and communicating the expanded discovery packet.

In Example 19, the subject matter of Example 18 includes, wherein the discovery packet is a data packet.

In Example 20, the subject matter of Example 19 includes, wherein communicating the expanded discovery packet includes selecting an interface of the ICN node to communicate the expanded discovery packet in accordance with a pending interest table (PIT) entry.

In Example 21, the subject matter of Example 20 includes, wherein the PIT entry was created in response to an interest packet version of the discovery packet corresponded to the discovery packet based on the discovery type.

In Example 22, the subject matter of Examples 18-21 includes, wherein the discovery packet is an interest packet.

In Example 23, the subject matter of Example 22 includes, wherein communicating the expanded discovery packet includes communicating the expanded discovery packet upon interfaces of the ICN node other than an interface upon which the discovery packet was received.

In Example 24, the subject matter of Examples 22-23 includes, wherein communicating the expanded discovery packet includes selecting an interface of the ICN node to communicate the expanded discovery packet in accordance with a forwarding information base (FIB) entry of the ICN node.

In Example 25, the subject matter of Examples 22-24 includes, wherein the first capability data is stored in an application parameters field of the interest packet.

In Example 26, the subject matter of Example 25 includes, wherein the application parameters field includes encoded capability data for several nodes.

In Example 27, the subject matter of Examples 22-26 includes, wherein the first capability data is stored in a capability field of the interest packet.

In Example 28, the subject matter of Example 27 includes, wherein the interest packet includes a separate capability field for each of several nodes that have added capability data to the discovery packet.

In Example 29, the subject matter of Examples 18-28 includes, wherein the first capability data is a provider list, the provider list including an entry for each node that has added capability data to the discovery packet.

In Example 30, the subject matter of Example 29 includes, receiving a second discovery packet within a time period of the discovery packet, the second discovery packet matching the discovery packet based on the discovery type; extracting a second provider list from the second discovery packet; comparing the provider list to the second provider list to determine that the second provider list is shorter than the provider list; and discarding the second discovery packet based on the second provider list being shorter than the provider list.

In Example 31, the subject matter of Examples 29-30 includes, receiving a second discovery packet within a time period of the discovery packet, the second discovery packet matching the discovery packet based on the discovery type; extracting a second provider list from the second discovery packet; and merging the second provider list into the provider list, wherein the provider list after the merge is stored in the ICN node and used in the expanded discovery packet.

In Example 32, the subject matter of Examples 29-31 includes, wherein the first capability data includes a route list, the route list including an entry for a route to nodes represented in the provider list.

In Example 33, the subject matter of Examples 18-32 includes, wherein the discovery packet includes a hop limit, each node on an outbound path from the source node modifying the hop limit to reach a termination condition upon which a last node will send the discovery packet back to the source node.

In Example 34, the subject matter of Example 33 includes, receiving a second discovery packet within a time period of the discovery packet, the second discovery packet matching the discovery packet based on the discovery type; extracting a second hop limit from the second discovery packet; comparing the hop limit to the second hop limit to determine that the second hop limit is further from the termination condition than the hop limit; and discarding the second discovery packet based on the second hop limit being further from the termination condition than the hop limit.

Example 35 is at least one machine readable medium including instructions for capability discovery in an information centric network (ICN), the instructions, when executed by processing circuitry, cause the processing circuitry to perform operations, wherein the operations comprise: receiving, at an ICN node, a discovery packet, the discovery packet including a discovery type corresponding to an indication of a node capability requested by a source node of the discovery packet; extracting, from the discovery packet, first capability data from an intermediate node; storing the first capability data locally to the ICN node; adding, to the discovery packet, second capability data from the ICN node to create an expanded discovery packet; and communicating the expanded discovery packet.

In Example 36, the subject matter of Example 35 includes, wherein the discovery packet is a data packet.

In Example 37, the subject matter of Example 36 includes, wherein communicating the expanded discovery packet includes selecting an interface of the ICN node to communicate the expanded discovery packet in accordance with a pending interest table (PIT) entry.

In Example 38, the subject matter of Example 37 includes, wherein the PIT entry was created in response to an interest packet version of the discovery packet corresponded to the discovery packet based on the discovery type.

In Example 39, the subject matter of Examples 35-38 includes, wherein the discovery packet is an interest packet.

In Example 40, the subject matter of Example 39 includes, wherein communicating the expanded discovery packet includes communicating the expanded discovery packet upon interfaces of the ICN node other than an interface upon which the discovery packet was received.

In Example 41, the subject matter of Examples 39-40 includes, wherein communicating the expanded discovery packet includes selecting an interface of the ICN node to communicate the expanded discovery packet in accordance with a forwarding information base (FIB) entry of the ICN node.

In Example 42, the subject matter of Examples 39-41 includes, wherein the first capability data is stored in an application parameters field of the interest packet.

In Example 43, the subject matter of Example 42 includes, wherein the application parameters field includes encoded capability data for several nodes.

In Example 44, the subject matter of Examples 39-43 includes, wherein the first capability data is stored in a capability field of the interest packet.

In Example 45, the subject matter of Example 44 includes, wherein the interest packet includes a separate capability field for each of several nodes that have added capability data to the discovery packet.

In Example 46, the subject matter of Examples 35-45 includes, wherein the first capability data is a provider list, the provider list including an entry for each node that has added capability data to the discovery packet.

In Example 47, the subject matter of Example 46 includes, wherein the operations comprise: receiving a second discovery packet within a time period of the discovery packet, the second discovery packet matching the discovery packet based on the discovery type; extracting a second provider list from the second discovery packet; comparing the provider list to the second provider list to determine that the second provider list is shorter than the provider list; and discarding the second discovery packet based on the second provider list being shorter than the provider list.

In Example 48, the subject matter of Examples 46-47 includes, wherein the operations comprise: receiving a second discovery packet within a time period of the discovery packet, the second discovery packet matching the discovery packet based on the discovery type; extracting a second provider list from the second discovery packet; and merging the second provider list into the provider list, wherein the provider list after the merge is stored in the ICN node and used in the expanded discovery packet.

In Example 49, the subject matter of Examples 46-48 includes, wherein the first capability data includes a route list, the route list including an entry for a route to nodes represented in the provider list.

In Example 50, the subject matter of Examples 35-49 includes, wherein the discovery packet includes a hop limit, each node on an outbound path from the source node modifying the hop limit to reach a termination condition upon which a last node will send the discovery packet back to the source node.

In Example 51, the subject matter of Example 50 includes, wherein the operations comprise: receiving a second discovery packet within a time period of the discovery packet, the second discovery packet matching the discovery packet based on the discovery type; extracting a second hop limit from the second discovery packet; comparing the hop limit to the second hop limit to determine that the second hop limit is further from the termination condition than the hop limit; and discarding the second discovery packet based on the second hop limit being further from the termination condition than the hop limit.

Example 52 is a system for capability discovery in an information centric network (ICN), the system comprising: means for receiving, at an ICN node, a discovery packet, the discovery packet including a discovery type corresponding to an indication of a node capability requested by a source node of the discovery packet; means for extracting, from the discovery packet, first capability data from an intermediate node; means for storing the first capability data locally to the ICN node; means for adding, to the discovery packet, second capability data from the ICN node to create an expanded discovery packet; and means for communicating the expanded discovery packet.

In Example 53, the subject matter of Example 52 includes, wherein the discovery packet is a data packet.

In Example 54, the subject matter of Example 53 includes, wherein the means for communicating the expanded discovery packet include means for selecting an interface of the ICN node to communicate the expanded discovery packet in accordance with a pending interest table (PIT) entry.

In Example 55, the subject matter of Example 54 includes, wherein the PIT entry was created in response to an interest packet version of the discovery packet corresponded to the discovery packet based on the discovery type.

In Example 56, the subject matter of Examples 52-55 includes, wherein the discovery packet is an interest packet.

In Example 57, the subject matter of Example 56 includes, wherein the means for communicating the expanded discovery packet include means for communicating the expanded discovery packet upon interfaces of the ICN node other than an interface upon which the discovery packet was received.

In Example 58, the subject matter of Examples 56-57 includes, wherein the means for communicating the expanded discovery packet include means for selecting an interface of the ICN node to communicate the expanded discovery packet in accordance with a forwarding information base (FIB) entry of the ICN node.

In Example 59, the subject matter of Examples 56-58 includes, wherein the first capability data is stored in an application parameters field of the interest packet.

In Example 60, the subject matter of Example 59 includes, wherein the application parameters field includes encoded capability data for several nodes.

In Example 61, the subject matter of Examples 56-60 includes, wherein the first capability data is stored in a capability field of the interest packet.

In Example 62, the subject matter of Example 61 includes, wherein the interest packet includes a separate capability field for each of several nodes that have added capability data to the discovery packet.

In Example 63, the subject matter of Examples 52-62 includes, wherein the first capability data is a provider list, the provider list including an entry for each node that has added capability data to the discovery packet.

In Example 64, the subject matter of Example 63 includes, means for receiving a second discovery packet within a time period of the discovery packet, the second discovery packet matching the discovery packet based on the discovery type; means for extracting a second provider list from the second discovery packet; means for comparing the provider list to the second provider list to determine that the second provider list is shorter than the provider list; and means for discarding the second discovery packet based on the second provider list being shorter than the provider list.

In Example 65, the subject matter of Examples 63-64 includes, means for receiving a second discovery packet within a time period of the discovery packet, the second discovery packet matching the discovery packet based on the discovery type; means for extracting a second provider list from the second discovery packet; and means for merging the second provider list into the provider list, wherein the provider list after the merge is stored in the ICN node and used in the expanded discovery packet.

In Example 66, the subject matter of Examples 63-65 includes, wherein the first capability data includes a route list, the route list including an entry for a route to nodes represented in the provider list.

In Example 67, the subject matter of Examples 52-66 includes, wherein the discovery packet includes a hop limit, each node on an outbound path from the source node modifying the hop limit to reach a termination condition upon which a last node will send the discovery packet back to the source node.

In Example 68, the subject matter of Example 67 includes, means for receiving a second discovery packet within a time period of the discovery packet, the second discovery packet matching the discovery packet based on the discovery type; means for extracting a second hop limit from the second discovery packet; means for comparing the hop limit to the second hop limit to determine that the second hop limit is further from the termination condition than the hop limit; and means for discarding the second discovery packet based on the second hop limit being further from the termination condition than the hop limit.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An ICN node comprising:
a first network interface;
a second network interface;
a memory; and
processing circuitry configured to:
receive a discovery packet on the first network interface, the discovery packet including a discovery type corresponding to an indication of a node capability requested by a source node of the discovery packet;
extracting, from the discovery packet, first capability data from an intermediate node;
storing the first capability data locally in the memory;
adding, to the discovery packet, second capability data from the ICN node to create an expanded discovery packet; and
communicating the expanded discovery packet on the second network interface.

2. The ICN node of claim 1, wherein the discovery packet is a data packet.

3. The ICN node of claim 2, wherein, to communicate the expanded discovery packet, the processing circuitry is configured to selected the second network interface from multiple network interfaces to communicate the expanded discovery packet in accordance with a pending interest table (PIT) entry.

4. The ICN node of claim 3, wherein the PIT entry was created in response to an interest packet version of the discovery packet that corresponded to the discovery packet based on the discovery type.

5. The ICN node of claim 1, wherein the discovery packet is an interest packet.

6. The ICN node of claim 5, wherein, to communicate the expanded discovery packet, the processing circuitry is configured to communicate the expanded discovery packet upon interfaces of the ICN node other than the first network interface upon which the discovery packet was received.

7. The ICN node of claim 5, wherein, to communicate the expanded discovery packet, the processing circuitry is configured to select the second network interface from multiple interfaces to communicate the expanded discovery packet in accordance with a forwarding information base (FIB) entry of the ICN node.

8. The ICN node of claim 5, wherein the first capability data is stored in an application parameters field of the interest packet.

9. The ICN node of claim 8, wherein the application parameters field includes encoded capability data for several nodes.

10. The ICN node of claim 5, wherein the first capability data is stored in a capability field of the interest packet.

11. The ICN node of claim 10, wherein the interest packet includes a separate capability field for each of several nodes that have added capability data to the discovery packet.

12. The ICN node of claim 1, wherein the first capability data is a provider list, the provider list including an entry for each node that has added capability data to the discovery packet.

13. The ICN node of claim 12, wherein the processing circuitry is configured to:
receive, via any network interface of the ICN node, a second discovery packet within a time period of the discovery packet, the second discovery packet matching the discovery packet based on the discovery type;
extract a second provider list from the second discovery packet;
compare the provider list to the second provider list to determine that the second provider list is shorter than the provider list; and
discard the second discovery packet based on the second provider list being shorter than the provider list.

14. The ICN node of claim 12, wherein the processing circuitry is configured to:
receive, via any network interface of the ICN node, a second discovery packet within a time period of the discovery packet, the second discovery packet matching the discovery packet based on the discovery type;
extract a second provider list from the second discovery packet; and
merge the second provider list into the provider list, wherein the provider list after the merge is stored in the memory and used in the expanded discovery packet.

15. The ICN node of claim 12, wherein the first capability data includes a route list, the route list including an entry for a route to nodes represented in the provider list.

16. The ICN node of claim 1, wherein the discovery packet includes a hop limit, each node on an outbound path from the source node modifying the hop limit to reach a termination condition upon which a last node will send the discovery packet back to the source node.

17. The ICN node of claim 16, wherein the processing circuitry is configured to:
receive, via any network interface of the ICN node, a second discovery packet within a time period of the discovery packet, the second discovery packet matching the discovery packet based on the discovery type;
extract a second hop limit from the second discovery packet;
compare the hop limit to the second hop limit to determine that the second hop limit is further from the termination condition than the hop limit; and
discard the second discovery packet based on the second hop limit being further from the termination condition than the hop limit.

18. At least one non-transitory machine readable medium including instructions for capability discovery in an information centric network (ICN), the instructions, when executed by processing circuitry, cause the processing circuitry to perform operations, wherein the operations comprise:

receiving, at an ICN node, a discovery packet, the discovery packet including a discovery type corresponding to an indication of a node capability requested by a source node of the discovery packet;

extracting, from the discovery packet, first capability data from an intermediate node;

storing the first capability data locally to the ICN node;

adding, to the discovery packet, second capability data from the ICN node to create an expanded discovery packet; and communicating the expanded discovery packet.

19. The at least one non-transitory machine readable medium of claim 18, wherein the discovery packet is an interest packet.

20. The at least one non-transitory machine readable medium of claim 18, wherein the first capability data is a provider list, the provider list including an entry for each node that has added capability data to the discovery packet.

* * * * *